United States Patent
Chinthalapudi et al.

(10) Patent No.: US 11,924,691 B2
(45) Date of Patent: Mar. 5, 2024

(54) METHOD FOR IMPROVING CALL PERFORMANCE IN WIRELESS NETWORK

(71) Applicant: SAMSUNG ELECTRONICS CO., LTD., Suwon-si (KR)

(72) Inventors: Srinivas Chinthalapudi, Bangalore (IN); Kashmira Kapoor, Bangalore (IN); Kedar Santosh Kumar Aalla, Bangalore (IN); Harsh Kothari, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 17/401,607

(22) Filed: Aug. 13, 2021

(65) Prior Publication Data

US 2022/0417798 A1    Dec. 29, 2022

(30) Foreign Application Priority Data

Jun. 24, 2021    (IN) .............................. 202141028469

(51) Int. Cl.
*H04W 28/00*    (2009.01)
*H04L 65/80*    (2022.01)
(Continued)

(52) U.S. Cl.
CPC ............. *H04W 28/24* (2013.01); *H04L 65/80* (2013.01); *H04W 76/16* (2018.02); *H04W 76/38* (2018.02)

(58) Field of Classification Search
None
See application file for complete search history.

(56) References Cited

U.S. PATENT DOCUMENTS

| | | | |
|---|---|---|---|
| 10,206,091 B2 * | 2/2019 | Ryu | ...................... H04W 76/12 |
| 10,492,243 B2 | 11/2019 | Chiang et al. | |

(Continued)

FOREIGN PATENT DOCUMENTS

| | | | | |
|---|---|---|---|---|
| CN | 111372327 | | 7/2020 | |
| EP | 3780757 | | 2/2021 | |
| WO | WO-2012050841 A1 * | | 4/2012 | ......... H04L 61/2007 |

OTHER PUBLICATIONS

Extended European Search Report dated Jan. 27, 2022 in corresponding European Patent Application No. 21199473.6 (15 pages).

(Continued)

*Primary Examiner* — Gerald A Smarth
(74) *Attorney, Agent, or Firm* — F. CHAU & ASSOCIATES, LLC

(57) ABSTRACT

The present disclosure provides a method for improving call performance in a wireless network. The method includes sending an invite request to a server to initiate a Voice over New Radio (VoNR) service, where the UE is connected with a first network entity, and where the invite request comprises a media feature tag. The method includes initiating an Evolved Packet System fallback (EPS FB) service timer based on the media feature tag and a quality of service (QoS) timer and establishing a call over a second network entity using a dedicated bearer when the EPS FB command is received from the server. The call is established over the second network entity using the dedicated bearer by sending a service request to the server and/or sending an update request to the server when the EPS FB timer is expired and the EPS FB command is not received from the server.

20 Claims, 12 Drawing Sheets

(51) Int. Cl.
    *H04W 28/24*     (2009.01)
    *H04W 76/16*     (2018.01)
    *H04W 76/38*     (2018.01)

(56) References Cited

U.S. PATENT DOCUMENTS

| | | | |
|---|---|---|---|
| 2019/0281506 A1* | 9/2019 | Chiang | H04W 76/19 |
| 2020/0112892 A1 | 4/2020 | Shi et al. | |
| 2021/0105847 A1* | 4/2021 | Prabhakar | H04L 43/026 |

OTHER PUBLICATIONS

Mediatek Inc, "Discussion paper on what UE should do if the EPS-FB or RAT fallback indication is delayed or not received from network when the call is initiated on NR", 3GPP Draft; C1-213253, 3rd Generation Partnership Project (3GPP), Moble Competence Centre ; 650, Route Des Lucioles ; F-06921 (4 pages).

Rosenberg, et al. "Indicating User Agent Capabilities in the Session Initiation Protocol (SIP)", rfc3840.txt, Indicating User Agent Capabilities in the Session Initiation Protocol(SIP)?; rfc3840.txt, Internet Engineering Tax Force (37 pages).

Samsung, "Correction on EPS fallback for voice service", 3GPP Draft; SP-200959, 3rd Generation Partnership Project (3GPP), Mobile Competence Centre ; 650, Route Des Lucioles ; F-06921 Sophia-Antipolis Cedex; France, vol. SA WG2, No. Elbonia; Oct. 12, 2020-Oct. 23, 2020 Nov. 30, 2020 (Nov. 30, 2020), XP0519637, 3 pages.

* cited by examiner

METHOD FOR IMPROVING CALL PERFORMANCE IN WIRELESS NETWORK

CROSS-REFERENCE TO RELATED APPLICATION

This application claims priority to and the benefit of Indian Patent Application No. 202141028469 filed on Jun. 24, 2021, the entire contents of which are incorporated by reference herein in their entirety.

FIELD OF INVENTION

The present disclosure relates to wireless communication, and more specifically related to an Internet Protocol (IP) Multimedia Subsystem (IMS) call in a wireless network.

BACKGROUND

Mobile communication systems may be deployed to provide voice call services to support a user's mobility. With the development of communication technology, communication systems now provide data communication services, or high speed data services. As mobile communication systems evolve to provide various additional services, such communication systems may face a lack of resources, as well as an increase in user demand for high speed data services. Therefore, further development of advanced mobile communication systems may be desired.

Accordingly, standardization of the 3rd Generation Partnership Project Long Term Evolution (3GPP LTE) as a next generation mobile communication system is ongoing. In addition, standardization of Internet Protocol (IP) Multimedia Subsystem (IMS) is also in progress to provide multimedia services, such as voice data and videos, etc., over a packet-switched network through which wireless/wired communication systems, including mobile communication systems, provide packets.

To meet the demand for wireless data traffic having increased since deployment of 4G communication systems, efforts have been made to develop an improved 5G or 5G New Radio (NR) communication systems. Therefore, 5G or 5G New Radio (NR) communication systems is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems, among other techniques.

NR devices (e.g., devices supported by a NR communication system) may use a Packet Switching (PS) mechanism for the voice session/call to establish a voice session/call over a 5G NR network, where the PS mechanism has been deployed for a LTE network. Furthermore, an IMS core network remains same for the LTE network, and the 5G NR network and call setup works on the same principle of a Quality of Service (QoS) reservation. Deployment and stability of the 5G NR network are still evolving. In some methods of a 5G NR network, Standalone (SA) devices (e.g., NR devices, User Equipment (UE)) has a mark-able dependency on a radio channel stability and support of voice packets scheduling, which requires a certain amount of time and effort to stabilize a Voice over NR (VoNR) using a SA architecture/SA devices. For an initial launch of the 5G NR network, the UE may be flexible to reuse the existing IMS core network to support telephony features. The 5G NR network redirects the UE to the LTE network to continue and establish the call successfully since the VoNR is not supported by the 5G NR network. The redirection is called as evolved packet system (EPS) fallback (EPS FB).

However, connections between the 5G NR network and the LTE network may fail due to poor signal conditions or may fail to complete a handover or redirection of a signal. As a result, the EPS FB or the 5G NR/LTE network fails to establish the voice session/call over a dedicated bearer. In the existing 5G NR network, UE uses a preconditioning mechanism. The UE waits for a certain time, and if the dedicated bearer is not established, the voice session/call may end with an access failure. Due to the access failure, the UE returns to the 5G NR network as part of a fast return. Return behavior can be repeated many times. Therefore, a call drop rate may become substantially high in the existing mechanism of establishing the voice session/call over the 5G NR network. Furthermore, the time required to re-establish the voice session/call after the EPS FB is considerably high since Session Initiation Protocol (SIP) signaling may be re-initiated as a new call setup procedure. In some systems, IMS core can support call recovery by using the additional SIP signaling procedures. However, these call recovery mechanisms may not be linked efficiently with a Non-Access Stratum (NAS) protocols (e.g., 3GPP NAS protocols), resulting in call drops and poor user experiences while establishing a connection between the NR devices and NR cells. Therefore, there is a need in the art for an alternative for the successful establishment of a voice session or call after the EPS FB.

SUMMARY

A method, apparatus, non-transitory computer readable medium, and system for improving an IMS call in a wireless network is described. Embodiments herein disclose a method for improving a call performance in a wireless network. The method includes sending, by a UE, an invite request to a server in the wireless network to initiate a Voice over New Radio (VoNR), where the UE is connected with a first network entity of the wireless network, where the invite request comprises a media feature tag. Further, the method includes initiating, by the UE, an Evolved Packet System (EPS) fallback (EPS FB) timer based on the media feature tag and a Quality of service (QoS) timer, where the media feature tag is received by the UE from the server as a response to the invite request. Further, the method includes determining, by the UE, whether an EPS FB command is received from the server, where the EPS FB command indicates a handover (HO) from the first network entity to a second network entity. Further, the method includes establishing, by the UE, a call over the second network entity using a dedicated bearer when the EPS FB command is received from the server, where the dedicated bearer is allocated by the server. Further, the method includes establishing, by the UE when the EPS FB command is not received from the server and the EPS FB timer is expired, the call over the second network entity using the dedicated bearer by at least one of sending a service request to the server and sending an update request to the server.

In an embodiment, the method further includes performing, by the UE, a Tracking Area Update (TAU) with the second network entity when the EPS FB command is received from the server. Further, the method includes determining, by the UE, whether the dedicated bearer is allocated to the UE from the server to establish the call over the second network entity when the TAU is updated successfully with the second network entity. Further, the method includes establishing, by the UE, the call over the second network entity when the dedicated bearer is allocated to the UE from the server, where the server terminates the EPS FB timer and a Quality of service (QoS) timer. Further, the method includes sending, by the UE, the update message to the server when the EPS FB timer is expired when the dedicated bearer is not allocated to the UE from the server. Further, the method includes allocating the dedicated bearer to establish the call over the second network entity, where the updated message indicates a reason for the EPS FB, where the server terminates the EPS FB timer and the QoS timer.

In an embodiment, where the UE releases the call and retries the call over a Circuit Switched Fall-back (CSFB) when the QoS timer is expired.

In an embodiment, the method further includes determining, by the UE, that the EPS FB timer is expired. Further, the method includes performing, by the UE, the HO from the first network entity to the second network entity when the EPS 1-13 timer is expired. Further, the method includes re-initiating, by the UE, the EPS FB timer. Further, the method includes determining, by the UE, that the TAU is updated successfully with the second network entity.

Further, the method includes determining, by the UE, whether the dedicated bearer is allocated to the UE from the server to establish the call over the second network entity when the TAU is updated successfully with the second network entity. Further, the method includes establishing, by the UE, the call over the second network entity when the dedicated bearer is allocated to the UE from the server, where the server terminates the EPS FB timer and the QoS timer. Further, the method includes sending, by the UE, the update request to the server when the EPS FB timer is expired when the dedicated bearer is not allocated to the UE from the server. Further, the method includes allocating the dedicated bearer to establish the call over the second network entity, where the updated message indicates a reason for the EPS FB, where the server terminates the EPS FB timer and the QoS timer.

In an embodiment, the method further includes sending, by the UE, the service request to the server to perform the HO from the first network entity to the second network entity when the EPS FB timer is expired. Further, the method includes performing, by the UE, the HO from the first network entity to the second network entity in response to receiving an acknowledgement of the service request. Further, the method includes determining, by the UE, that the TAU is updated successfully with the second network entity. Further, the method includes determining, by the UE, whether the dedicated bearer is allocated to the UE from the server to establish the call over the second network entity when the TAU is updated successfully with the second network entity. Further, the method includes establishing, by the UE, the call over the second network entity when the dedicated bearer is allocated to the UE from the server, where the server terminates the EPS FB timer and the QoS timer. Further, the method includes sending, by the UE, the update request to the server when the EPS FB timer is expired when the dedicated bearer is not allocated to the UE from the server. Further, the method includes allocating the dedicated bearer to establish the call over the second network entity, where the updated message indicates a reason for the EPS FB, where the server terminates the EPS FB timer and the QoS timer.

In an embodiment, the media feature tag indicates that at least one of an EPS FB and the VoNR is supported by the UE and the server during an Internet Protocol (IP) Multimedia Subsystem (IMS) call registration process. In an embodiment, the server recommending the EPS FB to the UE, where the UE enables the EPS FB timer. Further, the server recommending the VoNR to the UE, where the UE disables the EPS FB timer. In an embodiment, where the EPS FB timer is configured based on a deployment of at least one of the first network entity and the second network entity and a requirement of operators associated with the at least one of the first network entity and the second network entity. In an embodiment, the history of at least one of the EPS FB and the VoNR is stored in the UE.

In an embodiment, the method further includes sending, by the UE, the invite request to the server in the wireless network, where IMS services are registered over a Wi-Fi. Further, the method includes determining, by the UE, that the UE moved to a place where a signal quality of the Wi-Fi is weak and the UE has prior knowledge that the server does not support the VoNR, since the UE losing the Wi-Fi connection and camped on the NR. Further, the method includes performing, by the UE, a Wi-Fi to LTE (W2L) HO to continue the call over the Wi-Fi. Further, the method includes sending, by the UE, the service request to the server to perform the HO from the first network entity to the second network entity, when the Voice over Wi-Fi is initiated, the signal quality of the Wi-Fi is weak and the server does not support the VoNR. Further, the method includes receiving, by the first network entity, an acknowledgment of the service request from the server. Further, the method includes receiving, by the UE, the EPS FB command from the server, successful EPS FB, where the EPS FB command indicates the HO from the first network entity to the second network entity and information regarding the second network entity. Further, the method includes performing, by the UE, the TAU procedure with the server after connecting to the second network entity and an IMS Packet Data Network (PDN) connection handover to the second network entity. Further, the method includes sending, by the UE, sending the registration request to the server and receives an acknowledgment for the registration request. Further, the method includes establishing, by the UE, the call over the second network using the dedicated bearer.

Some embodiments herein include a UE with improved call performance in a wireless network. The UE includes an EPS FB controller coupled with a processor and a memory. The EPS FB controller is configured to send an invite request to a server in the wireless network to initiate a VoNR, where the UE is connected with a first network entity of the wireless network, where the invite request comprises a media feature tag. Further, the EPS FB controller is configured to initiate an EPS FB timer based on the media feature tag, where the media feature tag is received by the UE from the server as a response to the invite request. Further, the EPS FB controller is configured to determine whether the EPS FB command is received from the server, where the EPS FB command indicates the HO from the first network entity to a second network entity. Further, the EPS FB controller is configured to establish, when the EPS FB command is received from the server, the call over the second network entity using the dedicated bearer, where the dedicated bearer is allocated by the server. Further, the EPS FB controller is configured to establish, when the EPS FB timer is expired and the EPS FB command is not received from the server, the call over the second network entity using the dedicated bearer by at least one of sending the service request to the server and sending the update request to the server.

A method, apparatus, non-transitory computer readable medium, and system for improving an IMS call in a wireless network is described. Embodiments of the method, apparatus, non-transitory computer readable medium, and system include a server for improving call performance in a wireless network. The server includes an EPS FB controller coupled with a processor and a memory. The EPS FB controller is configured to receive an invite request from a UE, where the invite request comprises a media feature tag. Further, the EPS FB controller is configured to send a response to the received invite request. Further, the EPS FB controller is configured to send the EPS FB command to the UE. Further, the EPS FB controller is configured to allocate a dedicated bearer to the UE to establish the call. Further, the EPS FB controller is configured to allocate the dedicated bearer by at least one of by receiving a service request from the UE, allocating the dedicated bearer on successful TAU, and by receiving the update request from the UE when the EPS FB timer is expired.

A method, apparatus, non-transitory computer readable medium, and system for improving an IMS call in a wireless network is described. Embodiments of the method, apparatus, non-transitory computer readable medium, and system include sending an invite request to initiate a VoNR service, where the invite request comprises a media feature tag, and receiving a response to the invite request, the response comprising the media feature tag indicating that at least one of an EPS FB service and a VoNR service is supported during an IMS registration process. Embodiments of the method, apparatus, non-transitory computer readable medium, and system further include initiating a EPS FB timer and a QoS timer based on the media feature tag and determining whether an EPS FB command is received, where the EPS FB command indicates a HO from a first network entity to a second network entity. Embodiments of the method, apparatus, non-transitory computer readable medium, and system further include performing one of establishing a call over the second network entity using a dedicated bearer allocated by a server when the EPS FB command is received from the server and sending a service request to the server, sending an update request to the server, or both, when the EPS FB command is not received from the server and the EPS FB timer is expired.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Those method, user equipment (UE), and server are illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1A:
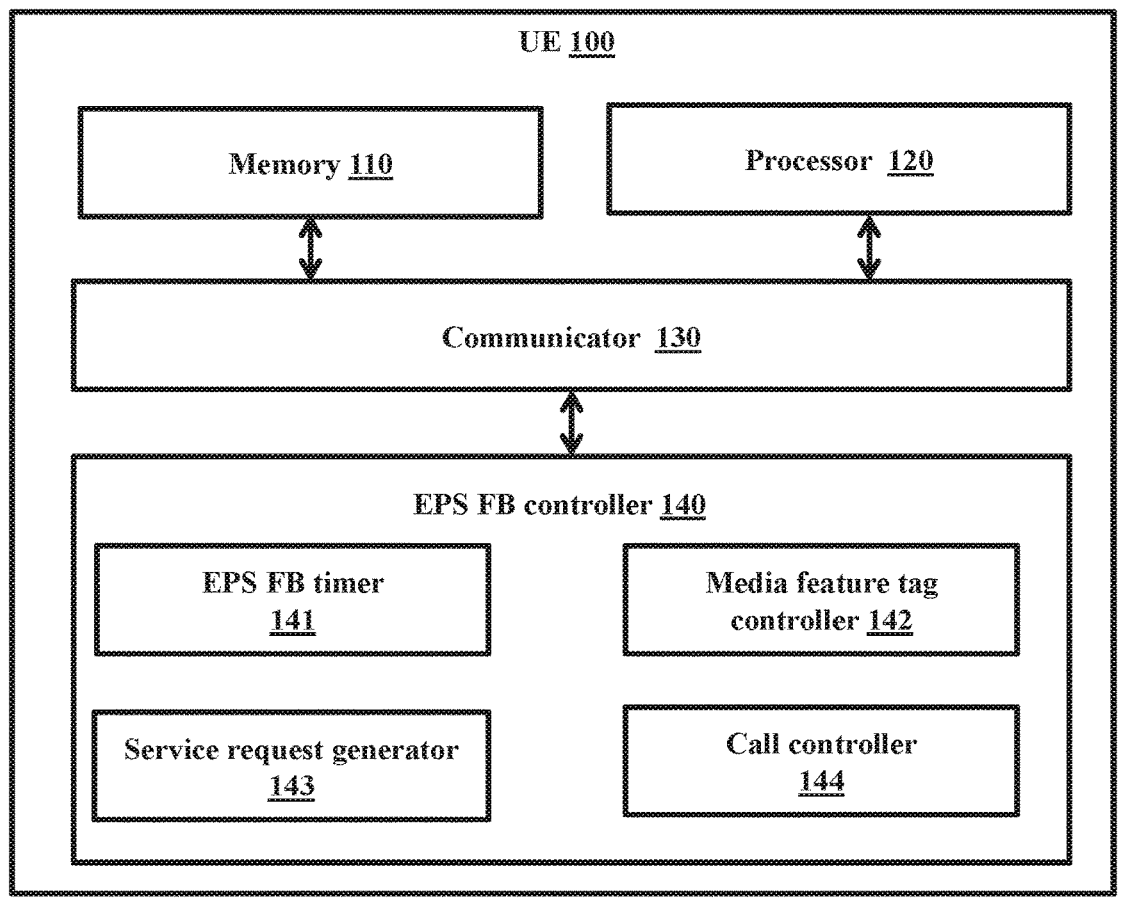
FIG. 1A illustrates a block diagram of a UE for improving a call performance in a wireless network, according to an embodiment as disclosed herein.

The present disclosure relates to wireless communication, and more specifically, to Internet Protocol (IP) Multimedia Subsystem (IMS) in a wireless network capable of improving call performance. In some embodiments, the present disclosure configures the Evolved Packet System (EPS) fallback (EPS FB) timer to monitor an EPS FB and the dedicated bearer configuration over a Long Term Evolution (LTE) network to establish the voice session/call in an ongoing session of a fifth generation (5G) New Radio (NR) network after the EPS FB. Therefore, there is reduced access failure in establishing a voice session or call. As a result, the call drop rate is reduced when the voice session or call is attempted over the 5G NR network.

A connection between a 5G NR network and an LTE network may have a poor signal. As a result, the connection may fail. Additionally, a handover or redirection of the connection may fail. Therefore, a wireless connection network may fail to establish a connection for a phone call.

Techniques described herein may include a method for improving a call performance by configuring an EPS FB timer for monitoring an EPS FB and a dedicated bearer configuration over an LTE network for establishing a voice session/call in an ongoing session of a NR network after the EPS FB. Accordingly, there may be no access failure of the dedicated bearer to establish the voice session/call. Therefore, a call drop rate becomes substantially low, according to one or more aspects of the present disclosure, when the voice session/call establishment has been attempted over the NR network.

Some embodiments may include sending an invite request with a new media feature tag when a UE is attached to the NR network, whereas the new media feature tag indicates that an EPS FB support or a VoNR supported negotiated with an Internet Protocol (IP) Multimedia Subsystem (IMS) call core network during an IMS registration procedure. A network responds to the invite request with the new media feature tag, where the EPS FB timer is enabled/disabled using the new media feature tag. The UE can use the EPS FB timer during a call setup process if the network recommends using the EPS FB. The UE may not use the EPS FB timer during the call setup process if the network recommends using the VoNR.

Some techniques described herein may enforce the network to trigger the 5G NR network to the LTE network handover (HO) & the dedicated bearer configuration towards the UE to optimize an EPS FB procedure when a service request is sent to the network by the UE and/or a quality of service (QoS) timer expires. Therefore, techniques of the present disclosure may connect the voice session/call within the same ongoing session, hence reducing an overall call setup duration. Furthermore, such techniques of the present disclosure provide real-time decision-making of an EPS FB timer criteria based on a log management of a user's previous call.

According to techniques described herein, call continuity performance between VoNR, Voice over Wireless Fidelity (VoWiFi), and Voice over LTE (VoLTE) may be improved by optimizing the EPS FB procedure and successfully establish the voice session/call after the EPS FB using existing SIP signaling and Non-Access Stratum (NAS) signaling messages in a least possible time.

A method for improving call performance in a wireless network is described. The method includes sending an invite request to a server to initiate a VoNR, where the UE is connected with a first network entity, and where the invite request comprises a media feature tag. Additionally, or alternatively, an EPS FB timer is initiated based on the media feature tag and a QoS timer and establishes a call over a second network entity using a dedicated bearer when the EPS FB command is received from the server. The call is established over the second network entity using the dedicated bearer by one of sending a service request to the server and sending an update request to the server when the EPS FB timer is expired and the EPS FB command is not received from the server.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments of the present disclosure may be described and illustrated in terms of blocks that carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the present disclosure. Likewise, the blocks of the embodiments may be physically combined into more complex blocks without departing from the scope of the present disclosure.

The accompanying drawings are used to help understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "first network entity" and "NR" are used interchangeably and mean the same. The terms "second network entity" and "LTE" are used interchangeably and mean the same. The terms "UE" and "IMS" are used interchangeably and mean the same. The terms "network", "IMS core network", "core network" and "server" are used interchangeably and mean the same.

Accordingly, embodiments herein disclose a method for improving call performance in a wireless network. The method includes sending, by a UE, an invite request to a server in the wireless network to initiate a VoNR, where the UE is connected with a first network entity of the wireless network, where the invite request comprises a media feature tag. Further, the method includes initiating, by the UE, an EPS FB timer based on the media feature tag and a QoS timer, where the media feature tag is received by the UE from the server as a response to the invite request. Further, the method includes determining, by the UE, whether an EPS FB command is received from the server, where the EPS FB command indicates a HO from the first network entity to a second network entity. Further, the method includes establishing, by the UE, a call over the second network entity using a dedicated bearer when the EPS FB command is received from the server, where the dedicated bearer is allocated by the server. Further, the method includes establishing, by the UE, the call over the second network entity using the dedicated bearer by at least one of sending a service request to the server and sending an update request to the server when the EPS FB timer is expired when the EPS FB command is not received from the server.

Accordingly, the embodiments herein provide the UE for improving the call performance in the wireless network. The UE includes an EPS FB controller coupled with a processor and a memory. The EPS FB controller is configured to send the invite request to the server in the wireless network to initiate the VoNR, where the UE is connected with the first network entity of the wireless network, where the invite request comprises the media feature tag. Further, the EPS FB controller is configured to initiate the EPS FB timer based on the media feature tag, where the media feature tag is received by the UE from the server as a response to the invite request. Further, the EPS FB controller is configured to determine whether the EPS FB command is received from the server, where the EPS FB command indicates the HO from the first network entity to the second network entity. Further, the EPS FB controller is configured to establish the call over the second network entity using the dedicated bearer when the EPS FB command is received from the server, where the dedicated bearer is allocated by the server. Further, the EPS FB controller is configured to establish the call over the second network entity using the dedicated bearer by at least one of sending the service request to the server and sending the update request to the server when the EPS FB timer is expired when the EPS FB command is not received from the server.

Accordingly, the embodiments herein provide the server for improving the call performance in the wireless network. The server includes an EPS FB controller coupled with a processor and a memory. The EPS FB controller is configured to receive the invite request from the UE, where the invite request comprises the media feature tag. Further, the EPS FB controller is configured to send a response to the received invite request. Further, the EPS FB controller is configured to send the EPS FB command to the UE. Further, the EPS FB controller is configured to allocate the dedicated bearer to the UE to establish the call. Further, the EPS FB controller is configured to allocate the dedicated bearer by at least one of by receiving the service request from the UE and by receiving the update request from the UE when the EPS FB timer is expired.

Embodiments of the present disclosure improve call performance by configuring the EPS FB timer for monitoring an EPS FB and the dedicated bearer configuration over an LTE network for establishing the voice session/call in an ongoing session of a 5G NR network after the EPS FB. So, there is no access failure of the dedicated bearer establishing the voice session/call. Therefore, a call drop rate becomes substantially low in the method of the present disclosure when the voice session/call establishment has been attempted over the 5G NR network.

Embodiments of the present disclosure send the invite request with the media feature tag when the UE is attached to the NR, whereas the media feature tag indicates that an EPS FB support or a VoNR supported negotiated with an IMS core network during an IMS registration procedure. The server responds to the invite request with the media feature tag, where the EPS FB timer is enabled/disabled using the new media feature tag. The UE can use the EPS FB timer during a call setup process if the server recommends using the EPS FB. The UE may not use the EPS FB timer during the call setup process if the server recommends using the VoNR. A total delay for EPS FB recovery is reduced by using the EPS FB timer and the media feature tag.

Embodiments of the present disclosure enforce triggering of the 5G NR network to the LTE network HO & the dedicated bearer configuration towards the UE to optimize the EPS FB when a service request is sent to the server by the UE and/or a QoS timer expires. Therefore, the method of the present disclosure connects the voice session/call within the same ongoing session and hence reducing an overall call setup duration. Furthermore, the method of the present disclosure provides real-time decision making of EPS FB timer criteria based on log management of a user's previous call.

Embodiments of the present disclosure provide a correlation between VoNR, VoWiFi, and VoLTE call performance to optimize the EPS FB procedure and successfully establish the voice session/call after the EPS FB using existing SIP signaling and Non-Access Stratum (NAS) signaling messages in a least possible time.

Referring now to the drawings, and more particularly to FIGS. 1A through 9B, there are shown preferred embodiments.

FIG. 1A illustrates a block diagram of a UE (100) for improving a call performance in a wireless network (1000), according to an embodiment as disclosed herein. In an embodiment, the UE (100) includes a memory (110), a processor (120), a communicator (130), and an EPS FB controller (140). The UE (100) may be a personal computer, laptop computer, mainframe computer, palmtop computer, personal assistant, mobile device, or any other suitable processing apparatus.

In an embodiment, the memory (110) is configured to store value of an EPS 1-13 timer (141), a media feature tag received from a server (400) (not shown in the FIG. 1A), a service request, an update request, TAU information, and dedicated bearer information. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable In certain examples, a non-transitory storage medium may store data that can, over time, change (e.g., in Random Access Memory (RAM) or cache). The memory (110) can be an internal storage unit or can be an external storage unit of the UE (100), a cloud storage, or any other type of external storage.

The processor (120) communicates with the memory (110), the communicator (130), and the EPS FB controller (140). The processor (120) is configured to execute instructions stored in the memory (110) and to perform various processes. The processor (120) may include one or a plurality of processors, maybe a general-purpose processor, such as a Central Processing Unit (CPU), an Application Processor (AP), or the like, a graphics-only processing unit such as a Graphics Processing Unit (GPU), a Visual Processing Unit (VPU), and/or an Artificial intelligence (AI) dedicated processor such as a Neural Processing Unit (NPU).

Processor (120) is an intelligent hardware device, which may include an application specific integrated circuit (ASIC), a field programmable gate array (FPGA), a programmable logic device, a discrete gate or transistor logic component, a discrete hardware component, or any combination thereof. In some cases, the processor (120) is configured to operate a memory array using a memory controller. In other cases, a memory controller is integrated into the processor (120). In some cases, the processor (120) is configured to execute computer-readable instructions stored in a memory to perform various functions. In some embodiments, a processor (120) includes special purpose components for modem processing, baseband processing, digital signal processing, or transmission processing.

The communicator (130) is configured for communicating internally between internal hardware components (e.g. the memory (110), the processor (120), and the EPS FB controller (140)) and with external devices (e.g. NR (200), LTE (300), and network (400)) via one or more networks (e.g. internet, Wi-Fi, Radio channel, etc.). The communicator (130) includes an electronic circuit specific to a standard that enables wired or wireless communication.

The EPS FB controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be located in one or more semiconductor chips, or on substrate supports such as printed circuit boards and the like.

In an embodiment, the EPS FB controller (140) is configured to send an invite request to the server (400) in the wireless network (1000) to initiate a VoNR, where the UE (100) is connected with a first network entity (200) of the wireless network (1000). The invite request comprises the media feature tag. Further, the EPS FB controller (140) is configured to initiate the EPS FB timer (141) based on the media feature tag, where the media feature tag is received by the UE (100) from the server (400) as a response of the invite request. Further, the EPS FB controller (140) is configured to determine whether an EPS FB command is received from the server (400). The EPS FB command indicates a handover (HO) from the first network entity (200) to a second network entity (300). Further, the EPS FB controller (140) is configured to establish a call over the second network entity (300) using a dedicated bearer when the EPS FB command is received from the server (400), where the dedicated bearer is allocated by the server (400). Further, the EPS FB controller (140) is configured to establish the call over the second network entity (300) using the dedicated bearer by at least one of sending a service request to the server (400) and sending an update request to the server (400) when the EPS FB timer (141) is expired when the EPS FB command is not received from the server (400).

For example, a server (400) may provide one or more data bearers (e.g., where the server (400) may create or remove a bearer, for example, according to control of a Mobility Management Entity (MME)). In a wireless communication system (e.g., such as LTE), a unit of a channel to which QoS can be applied may include or be referred to as a bearer (e.g., or an EPS bearer). A bearer may be used to transmit and support IP flows with the same QoS request. A bearer may be designated with a parameter related to QoS, such as a QoS Class Identifier (QCI) and Allocation and Retention Priority (ARP). QCI is a parameter defining the QoS priority as an integer. The ARP is a parameter to determine whether to accept or refuse the creation of a new EPS bearer. A bearer corresponds to a Packet Data Protocol (PDP) context of a wireless communication system. One bearer may belong or correspond to a Packet Data Network (PDN) connection.

In an embodiment, the EPS FB controller (140) is configured to perform a TAU with the second network entity (300) when the EPS FB command is received from the server (400). Further, the EPS FB controller (140) is configured to determine whether the dedicated bearer is allocated to the UE (100) from the server (400) to establish the call over the second network entity (300) when the TAU is updated successfully with the second network entity (300). The EPS FB controller (140) is then configured to establish the call over the second network entity (300) when the dedicated bearer is allocated to the UE (100) from the server (400), where the server (400) terminates the EPS FB timer (141) and a Quality of service (QoS) timer. The EPS FB controller (140) is configured to send the update message to the server (400) when the EPS FB timer (141) is expired when the dedicated bearer is not allocated to the UE (100) from the server (400) and allocating the dedicated bearer to establish the call over the second network entity (300), where the updated message indicates a reason for the EPS FB, where the server (400) terminates the EPS FB timer (141) and the QoS timer.

In an embodiment, the EPS FB controller (140) is configured to release the call and retry the call over a Circuit Switched Fall-back (CSFB) when the QoS timer is expired.

In an embodiment, the EPS FB controller (140) is configured to determine that the EPS FB timer (141) is expired. Further, the EPS FB controller (140) is configured to perform the HO from the first network entity (200) to the second network entity (300) when the EPS FB timer (141) is expired. Further, the EPS FB controller (140) is configured to re-initiate the EPS FB timer (141). Further, the EPS FB controller (140) is configured to determine that the TAU is updated successfully with the second network entity (300). Further, the EPS FB controller (140) is configured to send the update request to the server (400) when the EPS FB timer (141) is expired in response to determining that the dedicated bearer is not allocated to the UE (100) from the server (400). The EPS FB controller allocates the dedicated bearer to establish the call over the second network entity (300). The updated message indicates a reason for the EPS FB, where the server (400) terminates the EPS FB timer (141) and the QoS timer.

In an embodiment, the EPS FB controller (140) is configured to send the service request to the server (400) to perform the HO from the first network entity (200) to the second network entity (300) when the EPS FB timer (141) is expired. Further, the EPS FB controller (140) is configured to perform the HO from the first network entity (200) to the second network entity (300) in response to receiving an acknowledgment of the service request.

In an embodiment, the media feature tag indicates that at least one of an EPS FB and the VoNR is supported by the UE (100) and the server (400) during an IMS registration process.

VoNR is an IMS based service (e.g., an IMS based voice calling service) that leverages a 5G network. For examples, carrier-grade voice service (e.g., which has strict QoS support) and OTT voice service are two examples of voice services available over VoNR. EPS FB may refer to a service or a procedure where a 5G network is used for data but LTE is fallen back on (e.g., for voice or data when making or receiving calls). In some cases, data over 5G may optionally be reestablished after EPS FB.

In an embodiment, the EPS FB timer (141) is configured based on a deployment of at least one of the first network entity (200) and the second network entity (300) and the requirement of operators associated with the at least one of the first network entity (200) and the second network entity (300).

In an embodiment, a history of the at least one of the EPS FB and the VoNR is stored in the UE (100).

In an embodiment, the EPS FB controller (140) is configured to send the invite request to the server (400) in the wireless network (1000), where IMS services are registered over the Wi-Fi. Further, the EPS FB controller (140) is configured to determine that the UE (100) moved to a place where a signal quality of the Wi-Fi is weak and the UE (100) has prior knowledge that the server (400) does not support the VoNR, since the UE (100) losing the Wi-Fi connection and camped on the NR (200). Further, the EPS FB controller (140) is configured to perform a Wi-Fi to LTE (W2L) HO to continue the call over the Wi-Fi. Further, the EPS FB controller (140) is configured to send the service request to the server (400) to perform the HO from the first network entity (200) to the second network entity (300), when the Voice over Wi-Fi is initiated, the signal quality of Wi-Fi is weak, and the server (400) does not support the VoNR. Further, the EPS FB controller (140) is configured to receive an acknowledgment of the service request from the server (400) and the EPS FB command from the server (400), a successful EPS FB. The EPS FB command indicates the HO from the first network entity (200) to the second network entity (300) and information regarding the second network entity (300). Further, the EPS FB controller (140) is configured to perform the TAU procedure with the server (400) after connecting to the second network entity (300) and IMS Packet Data Network (PDN) connection HO to the second network entity (300). Further, the EPS FB controller (140) is configured to send the registration request to the server (400) and receives an acknowledgment for the registration request. Further, the EPS FB controller (140) is configured to establish the call over the second network (300) using the dedicated bearer.

In an embodiment, the EPS FB controller (140) includes the EPS FB timer (141), a media feature tag controller (142), a service request generator (143), and a call controller (144).

In an embodiment, the EPS FB timer (141) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the EPS FB timer (141) monitors the EPS FB and configuration of the dedicated bearer over the LTE (300) after the EPS FB. A value of the EPS FB timer (141) can be configured based on a network deployment (wireless network (1000)) and operator requirements. Recommended value of the EPS FB timer (141) is N-second which may be in between call setup timer (i.e. defined as timer used between Invite and 183 signaling) and precondition wait timers (i.e. defined as timer used between 183 signaling and dedicated bearer activation). Condition of the EPS FB timer (141) is given below, a) Stop the EPS FB timer (141) if the NR (200) to the LTE (300) (N2L) Radio Access Technology (RAT) change is successful based on the network (400) triggered HO or redirection along with the dedicated bearer establishment completes on the LTE (300) for the call.

b) On expiry of the EPS FB timer (141), if the UE (100) is still in the NR (200) RAT, trigger force RAT change to the LTE (300), restarts the EPS FB timer (141) to monitor scan of the LTE (300) and the dedicated bearer.

c) Stop the EPS FB timer (141) if running after completion of RAT change to the LTE (300) successfully and the dedicated bearer establishment.

d) If the EPS FB timer (141) expires in the LTE (300), the call with retry in the CSFB if the network (400) supports the CSFB based on a preconfigured setting of the UE (100) or capability of the network (400).

In an embodiment, the memory (110) stores a history of the UE (100) uses the EPS FB or the VoNR based on a Subscriber Identity Module (SIM) card and an area to decide uses of the EPS FB timer (141) or not. Furthermore, if the UE (100) knows that the VoNR is not supported by the network (400) and when the UE (100) moved to an area with a poor Wi-Fi signal and during active or alerting VoWIFI call, the UE (100) may switch to the LTE (300) using a EPS FB RAT request (EPS FB RAT REQ) approach before the HO from the Wi-Fi to 3GPP RAT.

In an embodiment, the media feature tag controller (142) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the media feature tag controller (142) sends the media feature tag in the invite message during an IMS register procedure. Examples of the media feature tag are given below.

a) "g.3gpp.epsfallback" for the EPS FB b) "g.3gpp.vonr" for the VoNR.

For example, a media feature tag may include a specific tag for wireless network (1000) interworking (e.g., for each messaging service, such as for EPS FB and VoNR, etc.). For example, if the server (400) provides a service (e.g., a messaging service, EPS FB, VoNR, etc.), the server (400) may insert a media feature tag into a response to an invite request from a UE (100) (e.g., into a header field of a response to the UE (100)'s invite request). A media feature tag may correspond a type of messaging service (e.g., decided by server (400)).

In an embodiment, the service request generator (143) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the service request generator (143) sends the service request to the server (400) to perform the HO from the first network entity (200) to the second network entity (300) when the EPS FB timer (141) is expired. Further, the service request generator (143) sends the update message to the server (400) when the EPS FB timer (141) is expired in response to determining that the dedicated bearer is not allocated to the UE (100) from the server (400). The updated message indicates the reason for the EPS FB.

In an embodiment, the call controller (144) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the call controller (144) establishes the call over the second network entity (300) when the dedicated bearer is allocated to the UE (100) from the server (400). In some examples, establishing a call may include or refer to detecting a cell (e.g., of the first network entity (200) and/or the second network entity (300)), establishing a connection (e.g., a PDU session), and initiating a service session.

Although the FIG. 1A shows various hardware components of the UE (100) but it is to be understood that other embodiments are not limited thereon. In other embodiments, the UE (100) may include less or more components. Further, the labels or names of the components are used only for illustrative purpose and does not limit the scope of the present disclosure. One or more components can be combined together to perform same or substantially similar function to improve the call performance in the wireless network (1000).

Figure 1B:
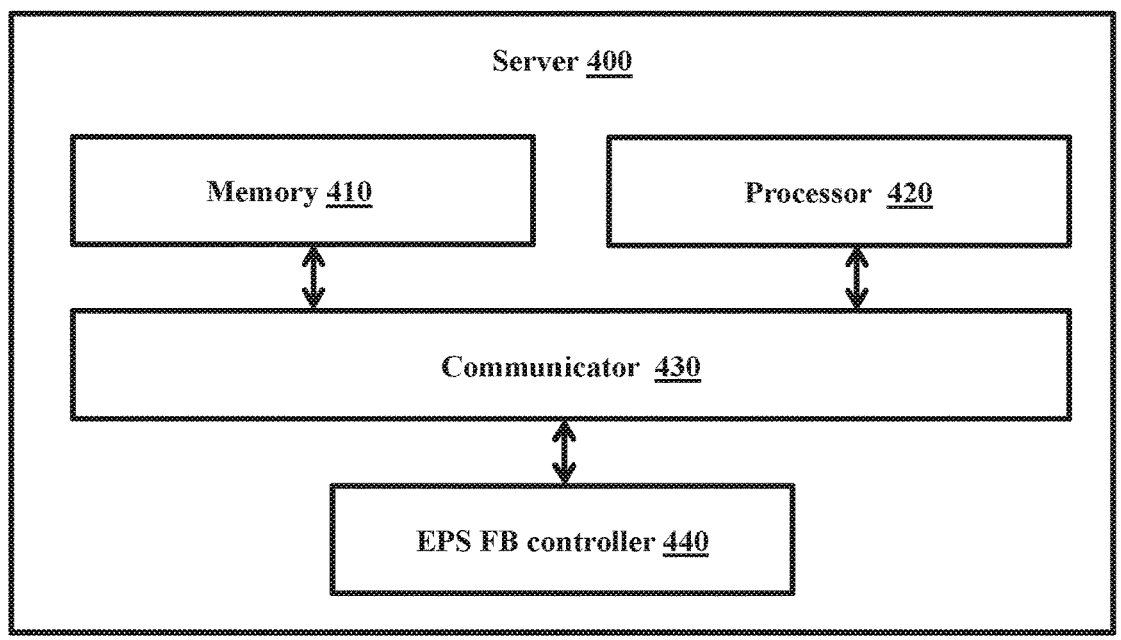
FIG. 1B illustrates a block diagram of a server for improving the call performance in the wireless network, according to an embodiment as disclosed herein.

FIG. 1B illustrates a block diagram of the server (400) for improving the call performance in the wireless network (1000), according to an embodiment as disclosed herein. In an embodiment, the server (400) includes a memory (410), a processor (420), a communicator (430), and an EPS FB controller (440).

A server (400) may provide one or more functions to users linked by way of one or more of the various networks. In some cases, the server (400) includes a single microprocessor board, which includes a microprocessor responsible for controlling all aspects of the server (400). In some cases, a server (400) uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server (400) is configured to send and receive hypertext markup language (HTML) formatted files (e.g., for displaying web pages). In various embodiments, a server (400) comprises a general purpose computing device, a personal computer, a laptop computer, a mainframe computer, a super computer, or any other suitable processing apparatus.

In an embodiment, the memory (410) is configured to store the value of the EPS 1-13 timer (141), the media feature tag received from the UE (100), the service request, the update request, the TAU information, and the dedicated barer information. The memory (410) stores instructions to be executed by the processor (420). The memory (410) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (410) may, in some examples, be considered a non-transitory storage medium. The term "non-transitory" may indicate that the storage medium is not embodied in a carrier wave or a propagated signal. However, the term "non-transitory" should not be interpreted that the memory (410) is non-movable In certain examples, a non-transitory storage medium may store data that can, over time, change (e.g., in Random Access Memory (RAM) or cache). The memory (410) can be an internal storage unit or can be an external storage unit of the UE (100), a cloud storage, or any other type of external storage.

In some examples, a UE (100) may include a transceiver. A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets to for transmission, and to demodulate received packets. In some examples, transceiver may be tuned to operate at specified frequencies. For example, a modem can configure the transceiver to operate at a specified frequency and power level based on the communication protocol used by the modem.

The processor (420) communicates with the memory (410), the communicator (430), and the EPS FB controller (140). The processor (420) is configured to execute instructions stored in the memory (410) and to perform various processes. The processor (420) may include one or a plurality of processors, maybe a general-purpose processor, such as a Central Processing Unit (CPU), an Application Processor (AP), or the like, a graphics-only processing unit such as a Graphics Processing Unit (GPU), a Visual Processing Unit (VPU), and/or an Artificial intelligence (AI) dedicated processor such as a Neural Processing Unit (NPU).

Processor (420) is an intelligent hardware device, which may include an application specific integrated circuit (ASIC), a field programmable gate array (FPGA), a programmable logic device, a discrete gate or transistor logic component, a discrete hardware component, or any combination thereof. In some cases, the processor (420) is configured to operate a memory array using a memory controller. In other cases, a memory controller is integrated into the processor (420). In some cases, the processor (420) is configured to execute computer-readable instructions stored in a memory to perform various functions. In some embodiments, a processor (420) includes special purpose components for modem processing, baseband processing, digital signal processing, or transmission processing.

The communicator (430) is configured for communicating internally between internal hardware components (e.g. the memory (410), the processor (420), and the EPS FB controller (440)) and with external devices (e.g. NR (200), LTE (300), and UE (100)) via one or more networks (e.g. internet, Wi-Fi, Radio channel, etc.). The communicator (430) includes an electronic circuit specific to a standard that enables wired or wireless communication.

The EPS FB controller (440) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the EPS FB controller (440) is configured to receive the invite request from the UE (100), where the invite request comprises the media feature tag. Further, the EPS FB controller (440) is configured to send a response to the received invite request. Further, the EPS FB controller (440) is configured to send the EPS FB command to the UE (100). Further, the EPS FB controller (440) is configured to allocate the dedicated bearer to the UE (100)

to establish the call. Further, the EPS FB controller (440) is configured to allocate the dedicated bearer by at least one of by receiving the service request from the UE (100) and by receiving the update request from the UE (100) when the EPS FB timer is expired. The update request comprises a new reason in SIP message to indicate an EPS FB fail in an update SIP method, for example, "Reason: SIP;cause=487; text=\"SDP QoS Fail during EPS Fallback\"" "(3GPP 24.237).

In an embodiment, the EPS FB controller (440) is configured to enable/disable the EPS FB timer (141),
  a) If the network (400) recommends using the EPS FB, then the UE (100) can use the EPS FB timer (141) during the call setup process.
  b) If the network (400) recommends using the VoNR then the UE (100) may not use the EPS FB timer (141) during the call setup process.

Based on an expiry of the EPS FB timer (141), if the UE (100) is still connected to the NR (200) RAT, the UE (100) may send the service request with a new service type defined to the network (400) for enforcing the network (400) to trigger the EPS FB to the LTE (300) and configuration of the dedicated bearer towards the UE (100) for the call. Further, the UE (100) restarts the EPS FB timer (141). The service type indicates a EPS FB type in the service request message. The network (400) decodes the new service type and initiates the HO or redirect procedure to the LTE (300). The service type is shown below Table.1:

TABLE 1

| Binary bit value | Service type |
| --- | --- |
| 0000 | Signaling |
| 0001 | Data |
| 0010 | Mobile terminated services |
| 0011 | Emergency services |
| 0100 | Emergency services fallback |
| 0101 | High priority access |
| 0110 | Elevated signaling |
| 0111 | Voice services EPS FB, new service type added to inform about EPS FB request |
| 1000 | Unused; shall be interpreted as "signaling", if received by the network |
| 1001 | Unused; shall be interpreted as "data", if received by the network |
| 1010 | Unused; shall be interpreted as "data", if received by the network |
| 1011 | Unused; shall be interpreted as "data", if received by the network |

In an embodiment, if the EPS FB timer (141) expires in the LTE (300) and if there is no dedicated bearer established in the LTE (300),
  a) If 183 signaling is not received from the network (400), then the UE (100) may perform a CS retry by closing the call/IMS call locally.
  b) If 183 signaling is received from the network (400), then the UE (100) may send an optional update procedure with Session Description Protocol (SDP) current QoS attributes set to none and add the new reason header mentioned above.
  c) The network (400) can understand based on SDP QoS parameters dedicated bearer not activated from the network (400) and indicate to Policy and Charging Rules Function (PCRF) to activate the dedicated bearer.
  d) Optionally the network (400) can see the reason header to send the cause to the PCRF for activation of the dedicated bearer.

Although the FIG. 1B shows various hardware components of the server (400), but it is to be understood that other embodiments are not limited thereon. In other embodiments, the server (400) may include less or more components. Further, the labels or names of the components are used only for illustrative purpose and does not limit the scope of the present disclosure. One or more components can be combined together to perform same or substantially similar function to improve the call performance in the wireless network (1000).

Figure 2:
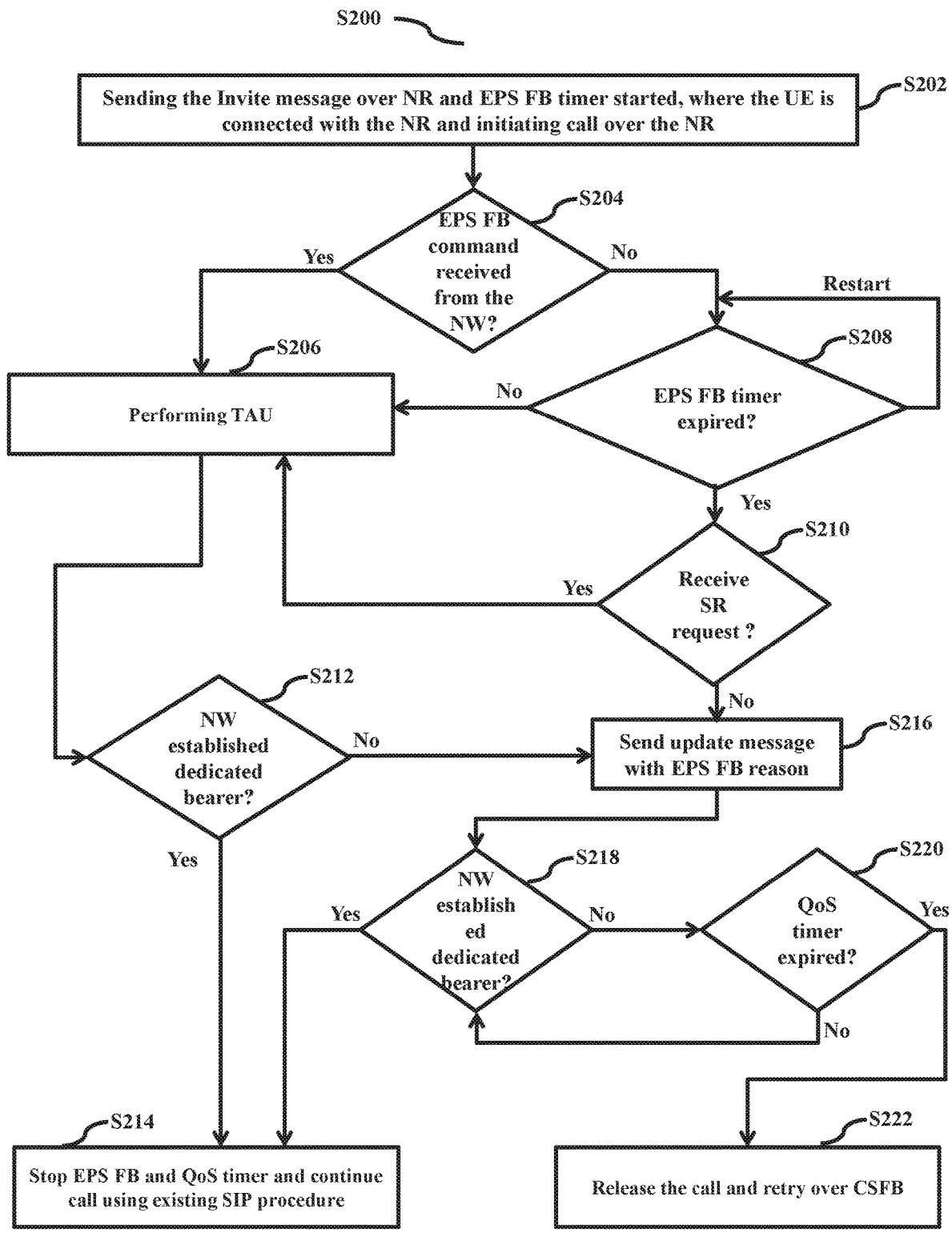
FIG. 2 is a flow diagram illustrating a method for improving the call performance in the wireless network, according to an embodiment as disclosed herein.

FIG. 2 is a flow diagram (S200) illustrating a method for improving the call performance in the wireless network (1000), according to an embodiment as disclosed herein. The operations (S202-S222) are performed by the EPS FB controller (140).

At step S202, the invite message may be sent over the NR (200) and the EPS FB timer (141) started, where the UE (100) is connected with the NR (200) and a call may be initiated over the NR (200). At step Step S204, the method includes determining whether the EPS FB command is received from the server (400). At step S206, the method includes performing the TAU with the second network entity (300) in response to determining that at least one of the EPS FB command is received from the server (400), receives the acknowledgment of the service request and the EPS FB timer (141) is expired/restart.

At step S208, the method includes determining whether the EPS FB timer (141) is expired in response to determining that the EPS FB command is not received from the server (400). At step S210, the method includes determining whether the server (400) receives the service request from the UE (100) in response to determining that the EPS FB timer (141) is expired. At step S212, the method includes determining whether the dedicated bearer is allocated to the UE (100) from the server (400) to establish the call over the second network entity (300) in response to determining that the TAU is updated successfully with the second network entity (300). At step S214, the method includes establishing the call over the second network entity (300) in response to determining that the dedicated bearer is allocated to the UE (100) from the server (400), where the server (400) expires the EPS FB timer (141) and the QoS timer.

At step S216, the method includes sending the update message to the server (400) by at least one of when the EPS FB timer (141) is expired in response to determining that the dedicated bearer is not allocated to the UE (100) from the server (400) and when the server (400) receives the service request from the UE (100), performing the TAU with the second network entity (300), and the dedicated bearer is not allocated to the UE (100) from the server (400). At step S218, the method includes determining whether the dedicated bearer is allocated to the UE (100) from the server (400) to establish the call over the second network entity (300) in response to receiving the update message. At step S220, the method includes determining whether the QoS timer is expired in response to determining that the dedicated bearer is not allocated to the UE (100) from the server (400). At step S222, the method includes release the call and retries the call over the CSFB when the QoS timer is expired.

The various actions, acts, blocks, steps, or the like in the flow diagram (S200) may be performed in the order presented, in a different order or simultaneously. Further, in some embodiments, some of the actions, acts, blocks, steps, or the like may be omitted, added, modified, skipped, or the like without departing from the scope of the present disclosure.

Figure 3:
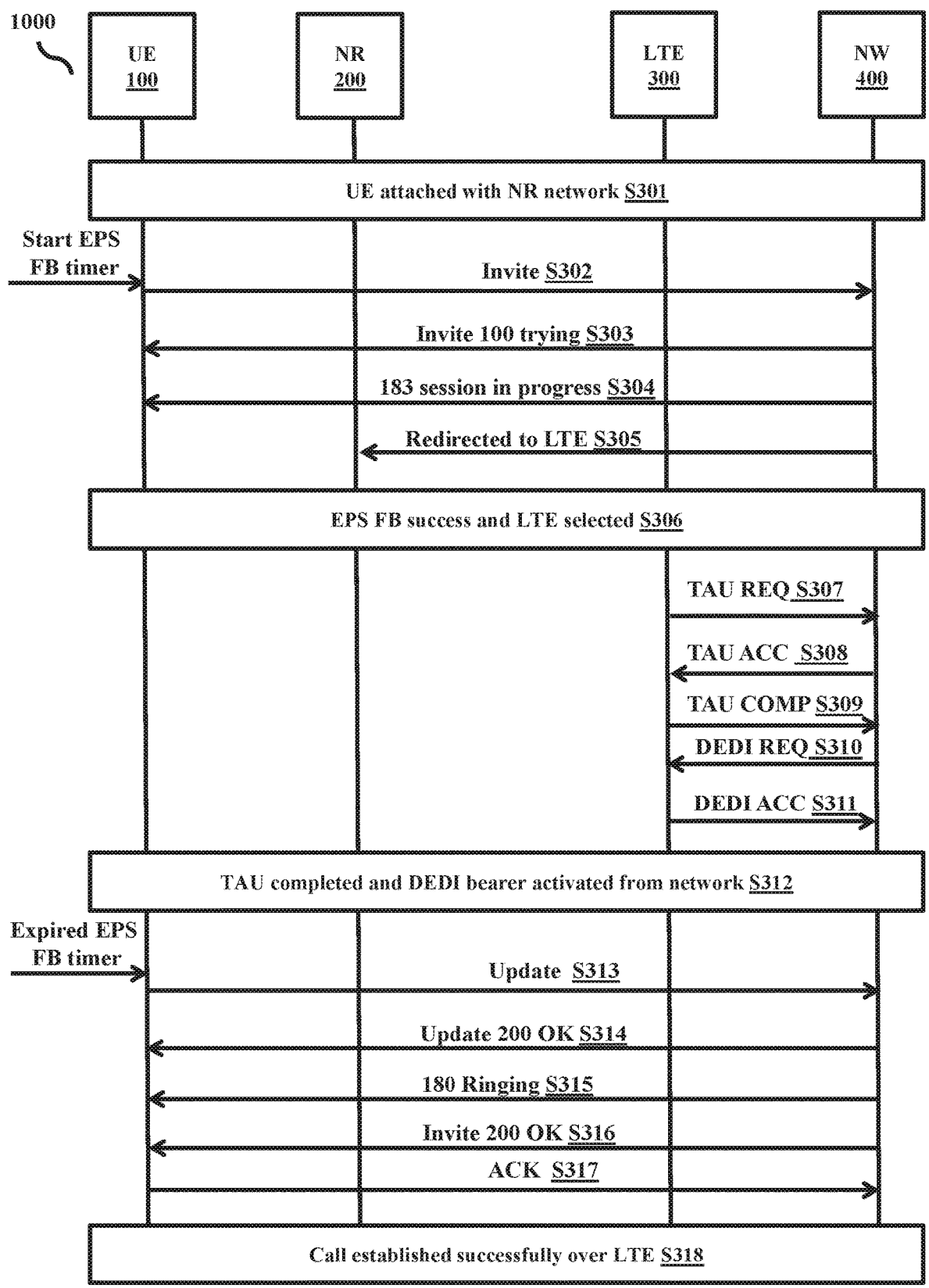
FIG. 3 is a sequential diagram illustrating signaling of the UE with wireless network entities for a successful Evolved Packet System (EPS) fallback (EPS FB) and allocation of a dedicated bearer to the UE to establish a call over a second network entity, according to an embodiment as disclosed herein.

FIG. 3 is a sequential diagram illustrating signaling of the UE (100) with wireless network entities (200, 300, and 400) for the successful EPS FB and allocation of the dedicated bearer to the UE (100) to establish the call over the second network entity (i.e., LTE (300)), according to an embodiment as disclosed herein.

At step S301, the UE (100) is connected with the first network entity (i.e., NR (200)) of the wireless network (1000). At step S302, the UE (100) sends the invite request to the server (i.e., network (400)) in the wireless network (1000). The invite request indicates the initiation of the voice call over NR (VoNR). Furthermore, the UE (100) initiates the EPS FB timer (141). At step S303 and S304, the UE (100) receives a response (i.e., invite 100 trying and 183 session in progress) from the server (400). At step S305, the first network entity (200) receives a redirection or the HO (i.e., EPS FB command) from the server (400). At step S306, the UE (100) receives the EPS FB command from the server (400), the successful EPS FB. The EPS FB command indicates the HO from the first network entity (200) to the second network entity (300) and the information regarding the second network entity (300) (i.e., LTE cell information).

At step S307-S309, after connecting to the second network entity (300), the UE (100) performs the TAU procedure with the server (400). At step S310-S312, the server (400) activates the dedicated bearer for the voice call/service. The EPS FB timer (141) terminates after receiving the dedicated bearer from the server (400) and completing the TAU procedure with the server (400). At step S313-S317, the SIP procedure continued as per the normal VoLTE call process. At step S318, the UE (100) establishes the call over the second network entity (300) in response to receiving the dedicated bearer from the server (400).

Figure 4:
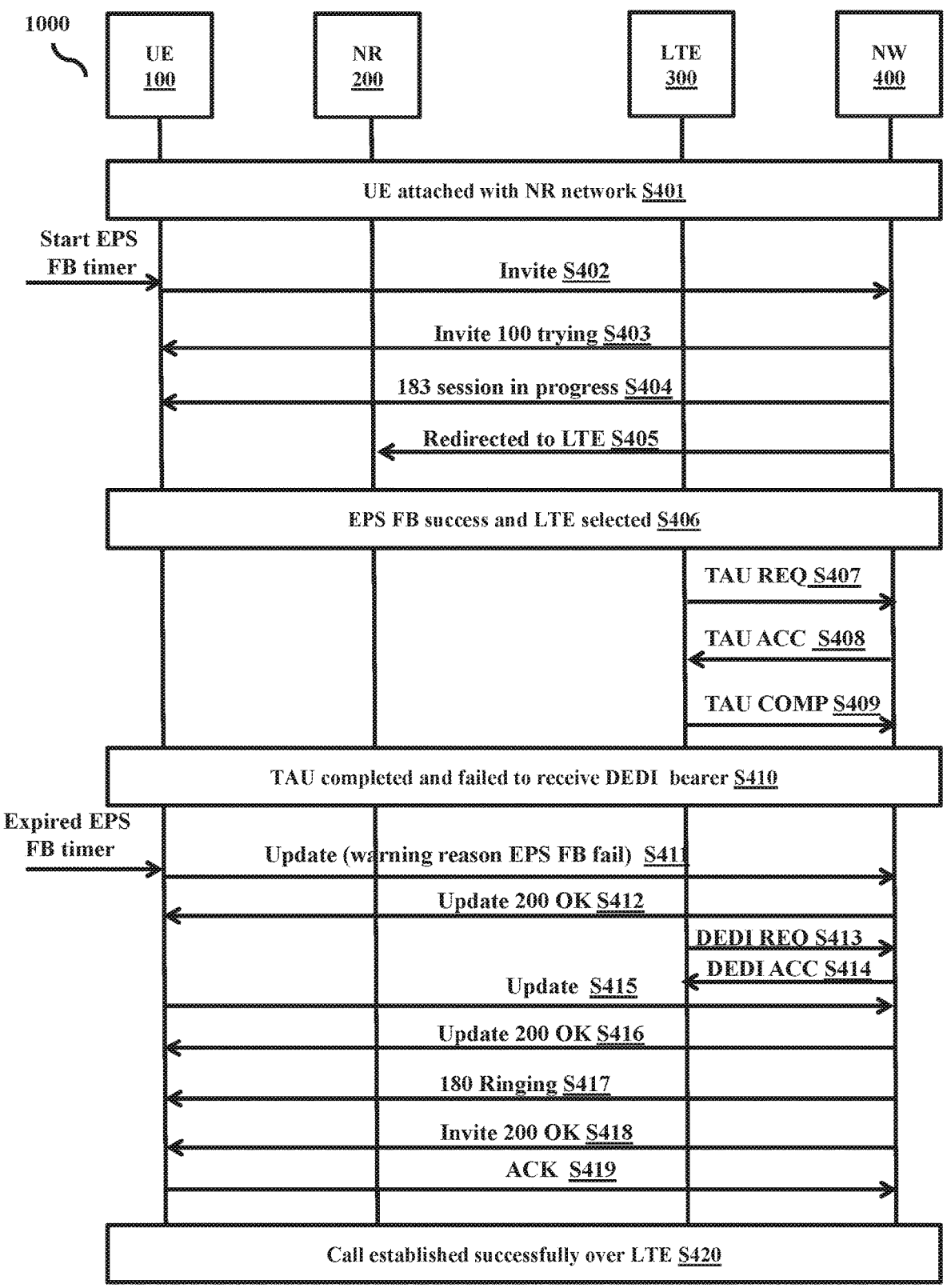
FIG. 4 is a sequential diagram illustrating signaling of the UE with the wireless network entities for the successful EPS FB and fail to allocate the dedicated bearer to the UE to establish the call over the second network entity, according to an embodiment as disclosed herein.

FIG. 4 is a sequential diagram illustrating signaling of the UE (100) with the wireless network entities (200, 300, and 400) for the successful EPS FB but fail to allocate the dedicated bearer to the UE (100) to establish the call over the second network entity (300), according to an embodiment as disclosed herein.

At step S401, the UE (100) is connected with the first network entity (200) of the wireless network (1000). At step S402, the UE (100) sends the invite request to the server (400) in the wireless network (1000). The invite request indicates the initiation of the VoNR. Furthermore, the UE (100) initiates the EPS FB timer (141). At step S403 and S404, the UE (100) receives the response from the server (400). At step S405, the first network entity (200) receives the redirection or the HO from the server (400). At step S406, the UE (100) receives the EPS FB command from the server (400), the successful EPS FB. The EPS FB command indicates the HO from the first network entity (200) to the second network entity (300) and the information regarding the second network entity (300).

At step S407-S409, after connecting to the second network entity (300), the UE (100) performs the TAU procedure with the server (400). At step S410, the UE (100) completed the TAU procedure but may fail to receive the dedicated bearer from the server (400) to establish the call over the second network entity (300). At step S411, the UE (100) sends the update message to the server (400) when the EPS FB timer (141) is expired and the dedicated bearer is not allocated to the UE (100) from the server (400). The updated message indicates the reason for the EPS FB. At step S412, the server (400) sends the acknowledgment of the updated message to the UE (100). At step S413-S414, the server (400) activates the dedicated bearer for the voice call/service. At step S415-S419, the SIP procedure continued as per the normal VoLTE call process. At step S420, the UE (100) establishes the call over the second network entity (300) in response to receiving the dedicated bearer from the server (400).

Figure 5:
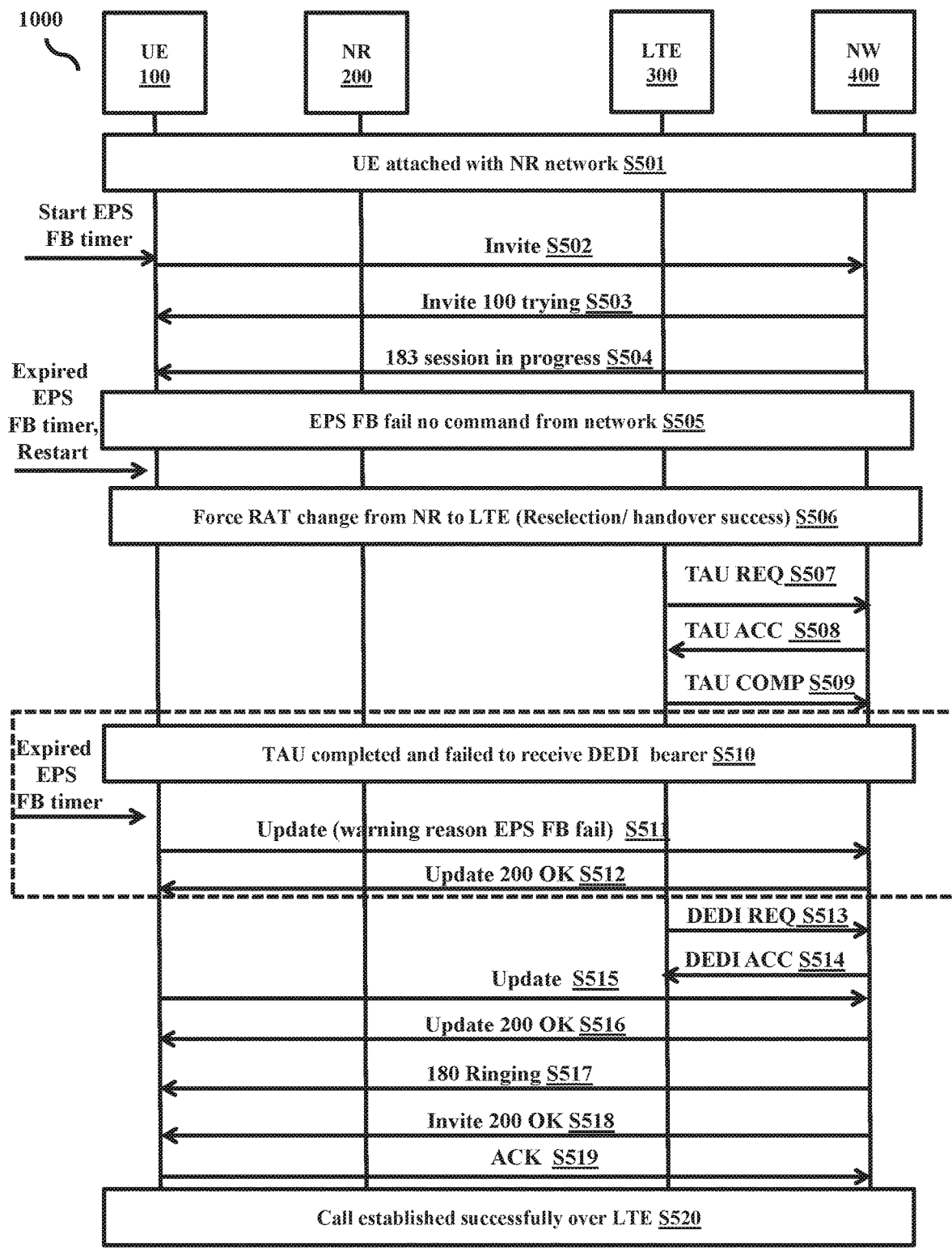
FIG. 5 is a sequential diagram illustrating signaling of the UE with the wireless network entities for an EPS FB failure and establishing the call over the second network entity using the dedicated bearer by sending an update request to the server when an EPS FB timer is expired, according to an embodiment as disclosed herein.

FIG. 5 is a sequential diagram illustrating signaling of the UE (100) with the wireless network entities (200, 300, and 400) for the EPS FB failure and establishing the call over the second network entity (300) using the dedicated bearer by sending the update request to the server (400) when the EPS FB timer (141) is expired, according to an embodiment as disclosed herein.

At step S501, the UE (100) is connected with the first network entity (i.e. NR (200)) of the wireless network (1000). At step S502, the UE (100) sends the invite request to the server (400) in the wireless network (1000), where the invite request indicates the initiation of the voice call over NR (VoNR). Furthermore, the UE (100) initiates the EPS FB timer (141). At step S503 and S504, the UE (100) receives the response from the server (400). At step S505, the first network entity (200) does not receive redirection or HO from the server (400), the EPS FB failure, when the EPS FB timer (141) is expired. The UE (100) re-initiates the EPS FB timer (141). At step S506, the UE (100) performs the HO (i.e. force RAT change) from the first network entity (200) to the second network entity (300) and receives information regarding the second network entity (300) when the EPS FB timer (141) is re-initiated.

At step S507-S509, after connecting to the second network entity (300), the UE (100) performs the TAU procedure with the server (400). At step S510, the UE (100) completed the TAU procedure but may fail to receive the dedicated bearer from the server (400) to establish the call over the second network entity (300). At step S511, the UE (100) sends the update message to the server (400) when the EPS FB timer (141) is expired and the dedicated bearer is not allocated to the UE (100) from the server (400). The updated message indicates the reason for the EPS FB. At step S512, the server (400) sends an acknowledgment (update 200 OK) of the updated message to the UE (100). At step S513-S514, the server (400) activates the dedicated bearer for the voice call/service. At step S515-S519, the SIP procedure continued as per the normal VoLTE call process. At step S520, the UE (100) establishes the call over the second network entity (300) in response to receiving the dedicated bearer from the server (400).

Figure 6A:
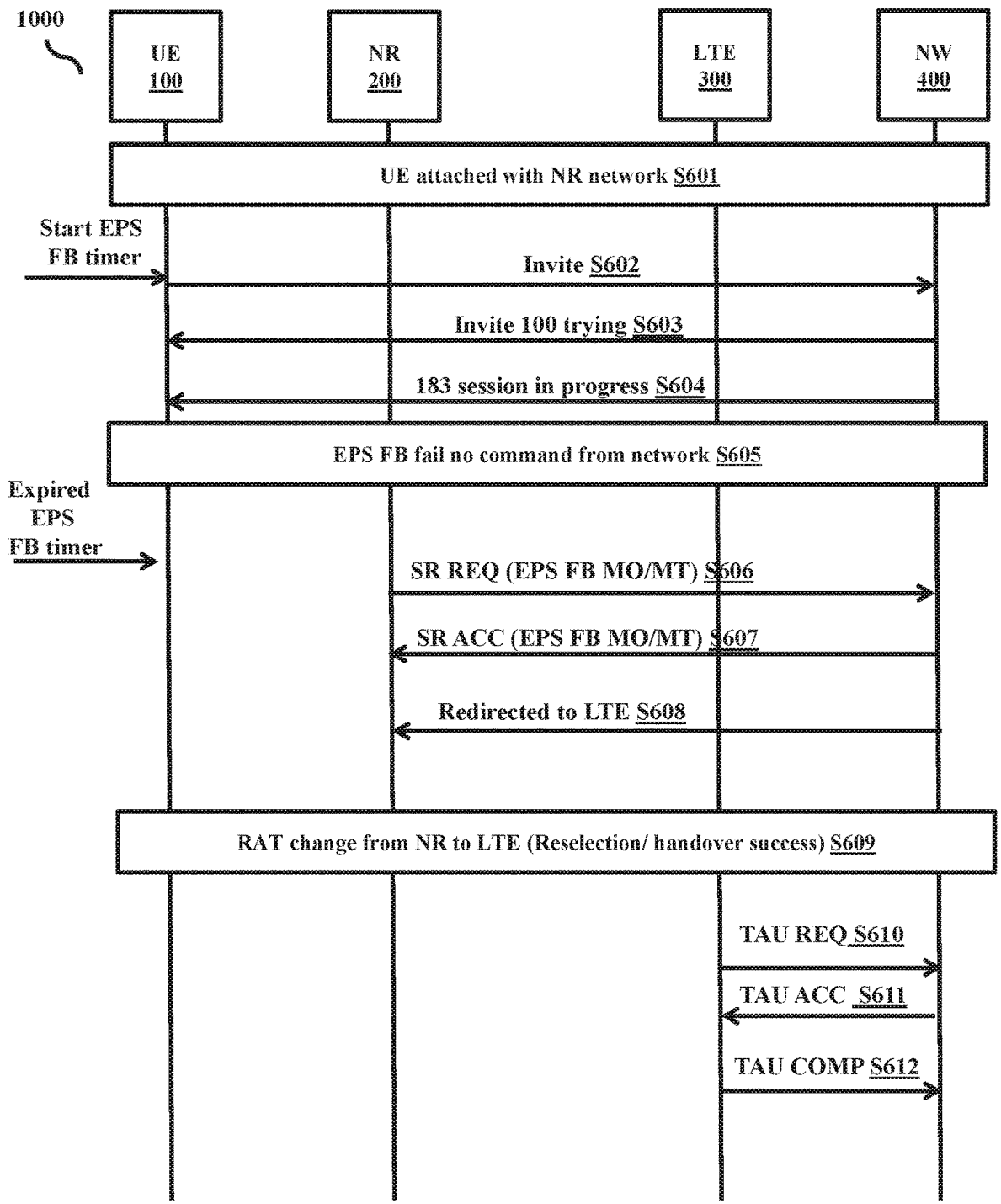
FIGS. 6A-6B illustrate a sequential diagram illustrating signaling of the UE with the wireless network entities for the EPS FB failure and establishing the call over the second network entity using the dedicated bearer by sending a service request to the server when the EPS FB timer is expired, according to an embodiment as disclosed herein.
Figure 6B:
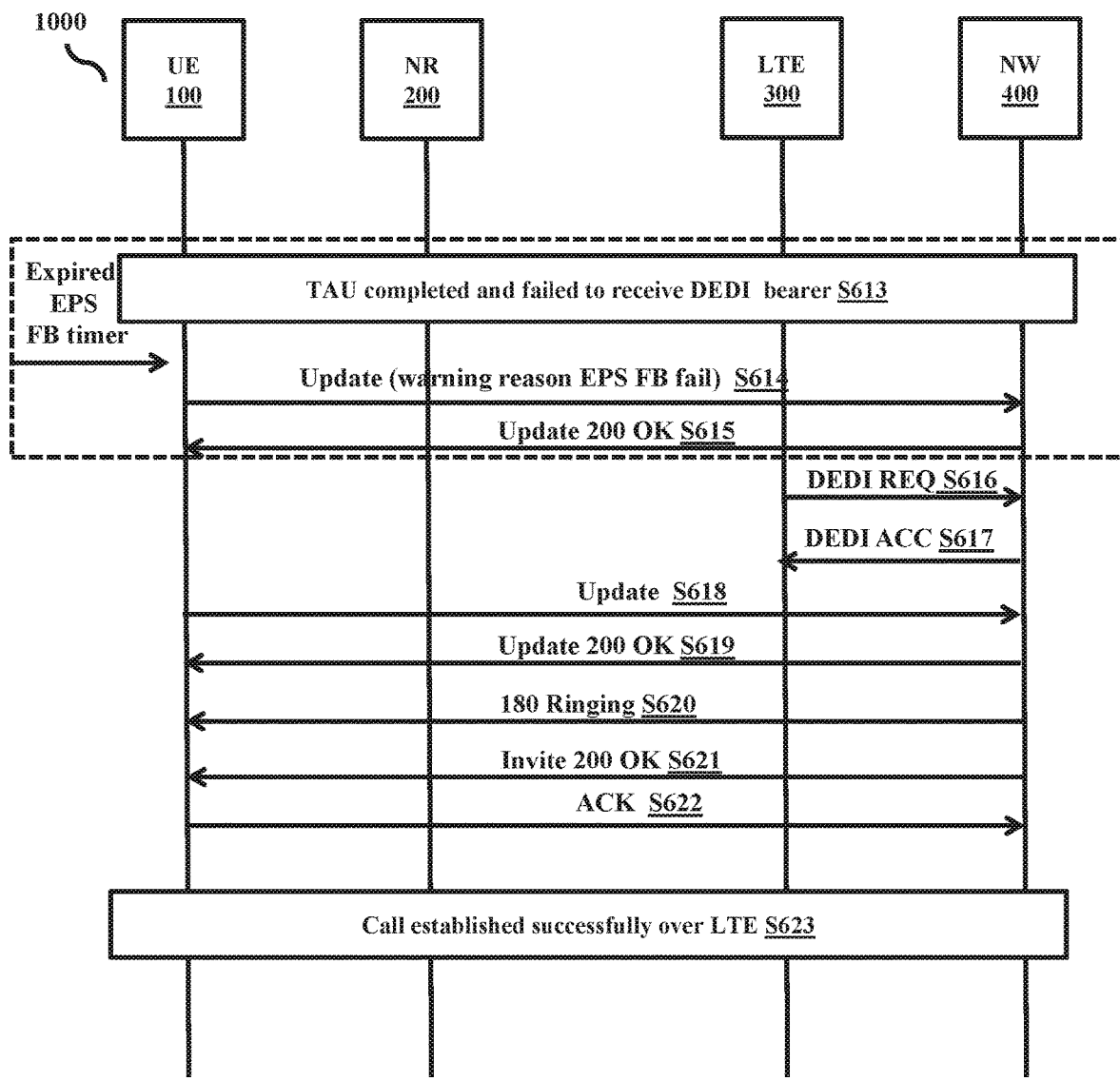

FIGS. 6A-6B illustrate a sequential diagram illustrating signaling of the UE (100) with the wireless network entities (200, 300, and 400) for the EPS FB failure and establishing the call over the second network entity (300) using the dedicated bearer by sending the service request to the server (400) when the EPS FB timer (141) is expired, according to an embodiment as disclosed herein.

At step S601, the UE (100) is connected with the first network entity (i.e. NR (200)) of the wireless network (1000). At step S602, the UE (100) sends the invite request to the server (i.e. network (400)) in the wireless network (1000), where the invite request indicates the initiation of the voice call over NR (VoNR). Furthermore, the UE (100) initiates the EPS FB timer (141). At step S603 and S604, the UE (100) receives the response from the server (400). At step S605, the first network entity (200) does not receive redirection or HO from the server (400), the EPS FB failure, when the EPS FB timer (141) is expired. At step S606, the UE (100) sends the service request to the server (400) to perform the HO from the first network entity (200) to the second network entity (300), when the EPS FB timer (141) is expired.

At step S607, the server (400) sends an acknowledgment (i.e., SR ACC) of the service request to the first network entity (200). At step S608, the first network entity (200) receives the redirection or the HO from the server (400). At step S609, the UE (100) receives the EPS FB command from the server (400), the successful EPS FB, where the EPS FB command indicates the HO from the first network entity (200) to the second network entity (300). The EPS FB command may also include information regarding the second network entity (300) (LTE cell information). At step S610-S612, after connecting to the second network entity (300), the UE (100) performs the TAU procedure with the server (400).

At step S613, the UE (100) completed the TAU procedure but failed to receive the dedicated bearer from the server (400) to establish the call over the second network entity (300). At step S614, the UE (100) sends the update message to the server (400) when the EPS FB timer (141) is expired, and the dedicated bearer is not allocated to the UE (100) from the server (400). The updated message indicates the reason for the EPS FB. At step S615, the server (400) sends the acknowledgment of the updated message to the UE (100). At step S616-S617, the server (400) activates the dedicated bearer for the voice call/service. At step S618-S622, the SIP procedure continued as per the normal VoLTE call process. At step S623, the UE (100) establishes the call over the second network entity (300) in response to receiving the dedicated bearer from the server (400).

Figure 7A:
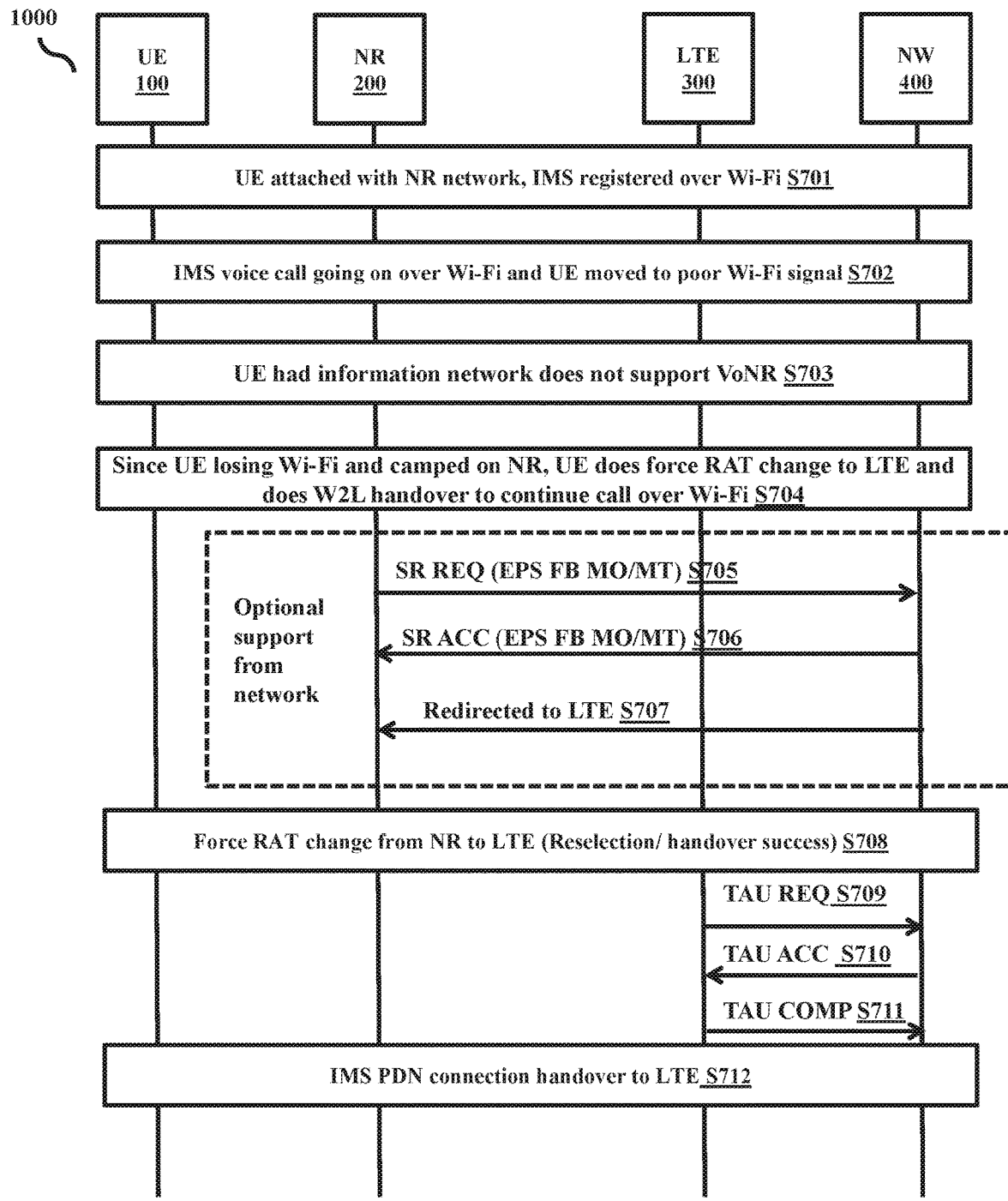
FIGS. 7A-7B illustrate a sequential diagram illustrating signaling of the UE with the wireless network entities for a Voice over Wi-Fi (VoWi-Fi) to a Voice over NR (VoNR) handover (HO), according to an embodiment as disclosed herein.
Figure 7B:
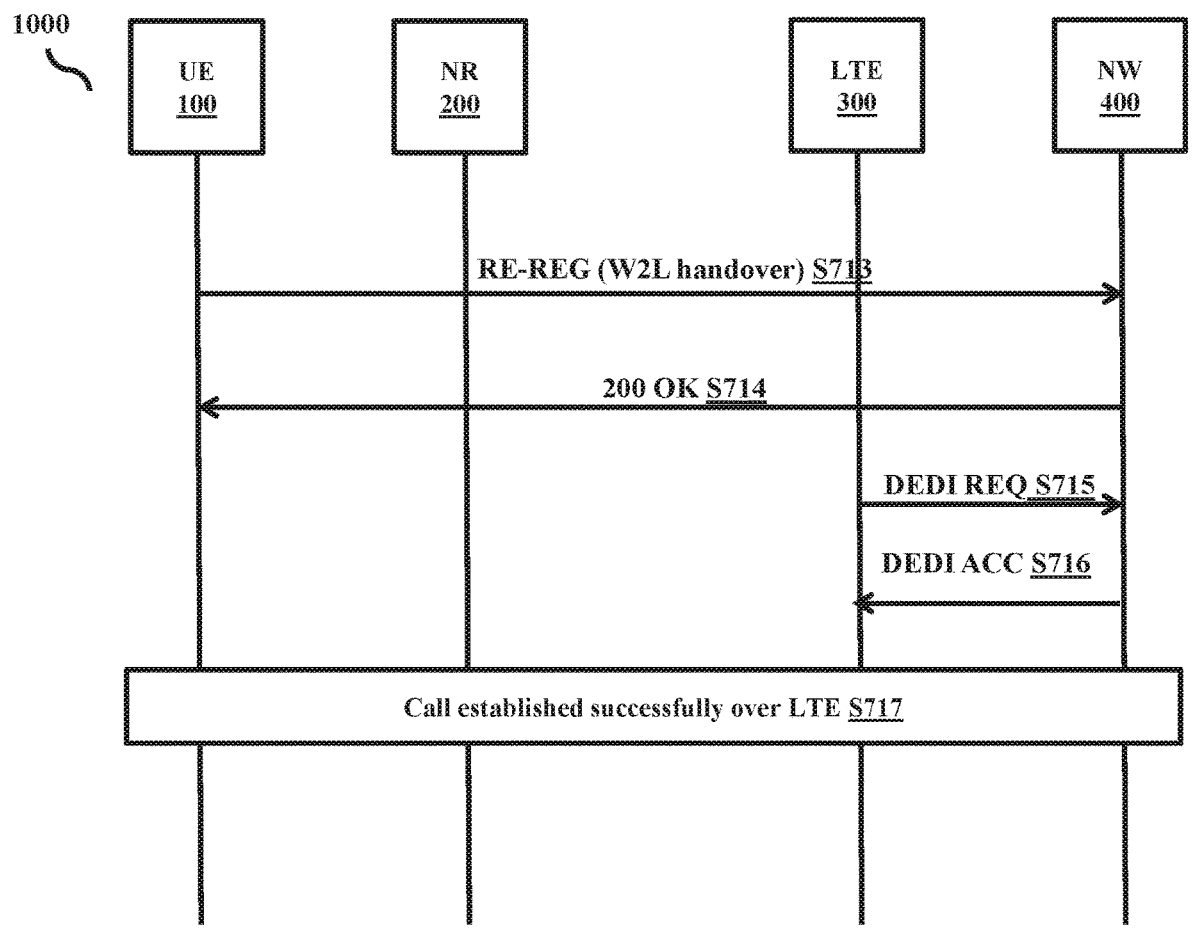

FIGS. 7A-7B illustrate a sequential diagram illustrating the signaling of the UE (100) with the wireless network entities (200, 300, and 400) for the Voice over Wi-Fi (VoWi-Fi) to the VoNR HO, according to an embodiment as disclosed herein.

At step S701, the UE (100) is connected with the first network entity (i.e., NR (200)) of the wireless network (1000) and IMS services registered over the Wi-Fi. At step S702, the IMS voice call going on over the Wi-Fi and the UE (100) moved to a place where the signal quality of Wi-Fi is weak. At step S703-S704, the UE (100) had information that the server (400) does not support the VoNR. The UE (100) has forced to RAT change to the LTE (300) and does Wi-Fi to LTE (W2L) HO to continue call over the Wi-Fi since the UE (100) losing the Wi-Fi connection and camped on the NR (200).

At step S705, the UE (100) sends the service request to the server (400) to perform the HO from the first network entity (200) to the second network entity (300), when the VoWi-Fi is initiated, the signal quality of the Wi-Fi is weak, and the server (400) does not support the VoNR. At step S706, the server (400) sends an acknowledgment (SR ACC) of the service request to the first network entity (200). At step S707, the first network entity (200) receives redirection or HO (i.e. EPS FB command) from the server (400). At step S708, the UE (100) receives the EPS FB command from the server (400), the successful EPS FB, where the EPS FB command indicates the HO from the first network entity (200) to the second network entity (300). The EPS FB command may also include information regarding the second network entity (300) (LTE cell information).

At step S709-S711, after connecting to the second network entity (300), the UE (100) performs the TAU procedure with the MME (400). At step S712, IMS Packet Data Network (PDN) connection handover to the LTE (300). At step S713-S714, the UE (100) sends a registration request (i.e. RE-REG (W2L HO)) to the server (400) and receives the acknowledgement for the registration request. At step S715-S716, the server (400) activates the dedicated bearer for the voice call/service and the SIP procedure continued as per the normal VoLTE call process. At step S717, the UE (100) establishes the call over the second network entity (300) in response to receiving the dedicated bearer from the server (400). So, as per above description, the UE (100) can do the EPS FB before initiating W2L HO to continue the call and avoid a delay or drop by doing handover to the NR (200).

Figure 8:
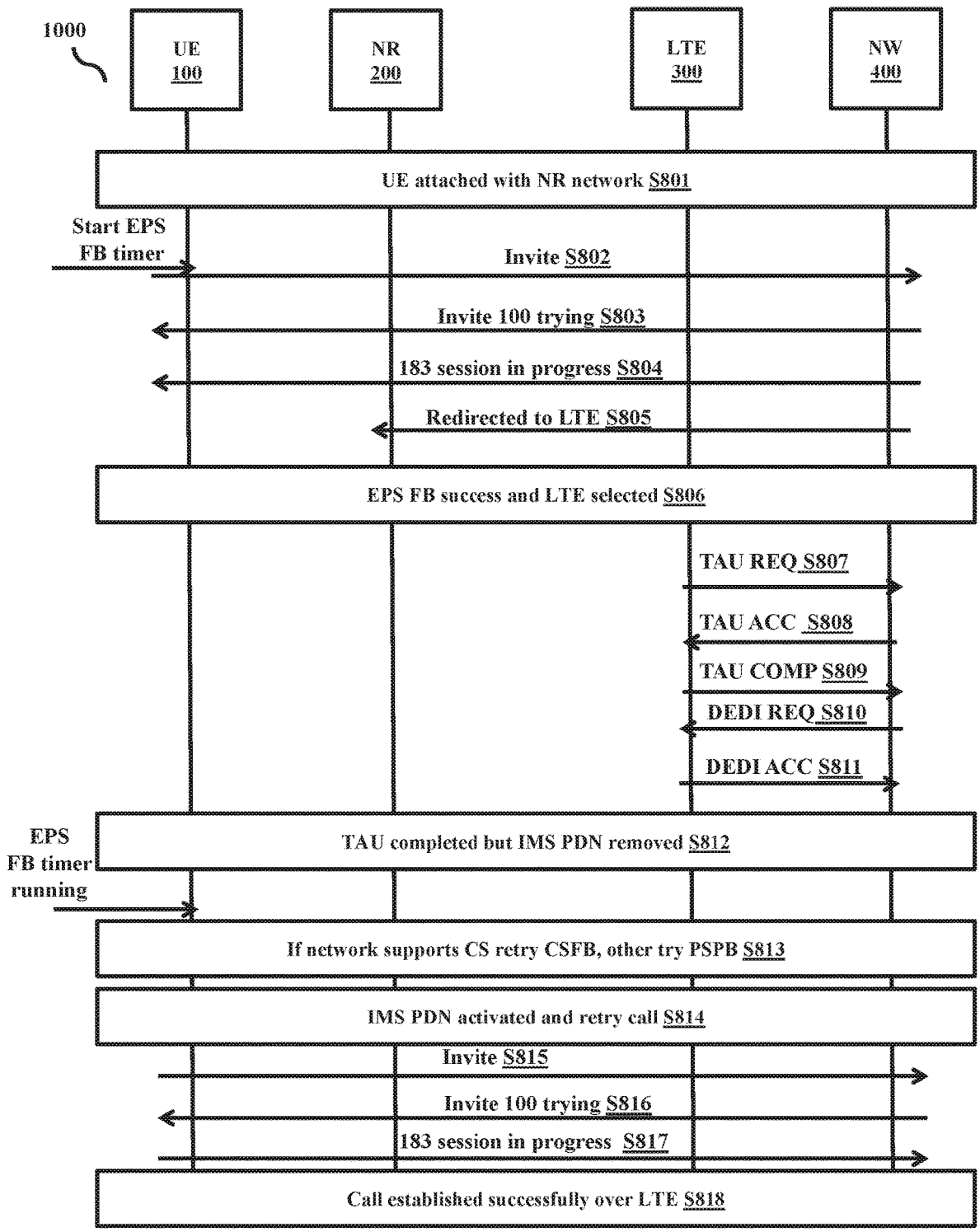
FIG. 8 is a sequential diagram illustrating signaling of the UE with the wireless network entities when an IMS Packet Data Network (PDN) is removed after the successful EPS FB, allocation of the dedicated bearer, and establishing the call over the second network entity, according to an embodiment as disclosed herein.

FIG. 8 is a sequential diagram illustrating signaling of the UE (100) with the wireless network entities (200, 300, and 400) when the IMS PDN is removed after successful EPS FB and allocation of the dedicated bearer and establishing the call over the second network entity (300), according to an embodiment as disclosed herein.

At step S801, the UE (100) is connected with the first network entity (200) of the wireless network (1000). At step S802, the UE (100) sends the invite request to the server (400) in the wireless network (1000), where the invite request indicates initiation of the VoNR. Furthermore, the UE (100) initiates the EPS FB timer (141). At step S803 and S804, the UE (100) receives the response from the server (400). At step S805, the first network entity (200) receives the redirection or the HO from the server (400). At step S806, the UE (100) receives the EPS FB command from the server (400), successful EPS FB, where the EPS FB command indicates the HO from the first network entity (200) to the second network entity (300). The EPS FB command may also include information regarding the second network entity (300).

At step S807-S809, after connecting to the second network entity (300), the UE (100) performs the TAU procedure with the server (400). At step S810-S811, the server (400) activates the dedicated bearer for the voice call/service. At step S812-S818, the TAU procedure is completed with the core network (400) but IMS PDN is removed due to some context mismatch on the network (400), and the EPS FB timer (141) is still running During that time, the UE (100) releases the voice call and retries the voice call over the CSFB or PSPB. In case of PSFB the IMS PDN is reactivated, then the UE (100) retries the voice call over the new session. So, in this case, the method of the present disclosure initiates IMS PDN activation over the LTE (300) and does silent redial of voice calls using VoLTE procedure.

Figure 9A:
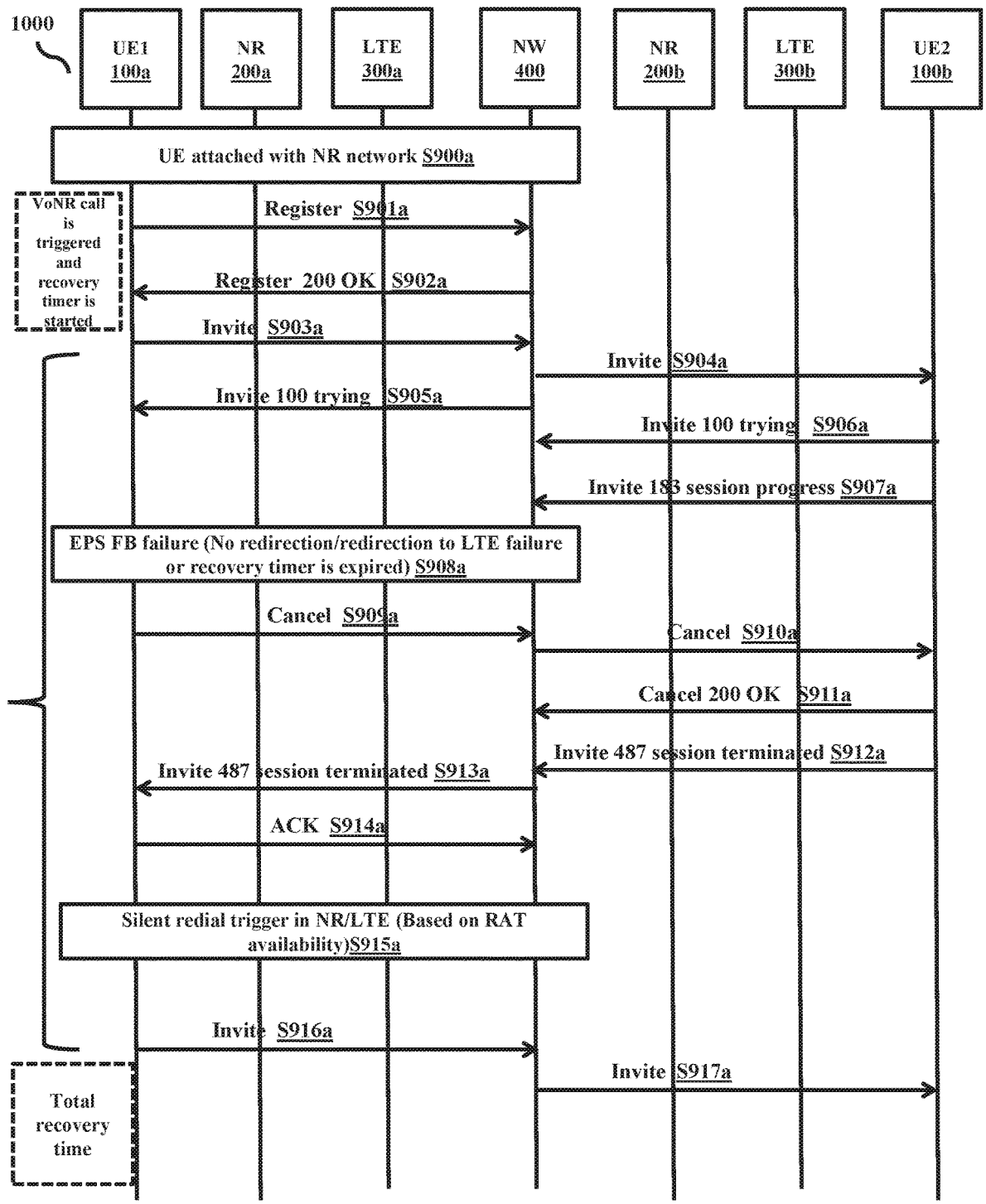
FIGS. 9A-9B illustrate a comparison between a silent redial procedure and the EPS FB timer approach when the EPS FB is failed, according to an embodiment as disclosed herein.
Figure 9B:
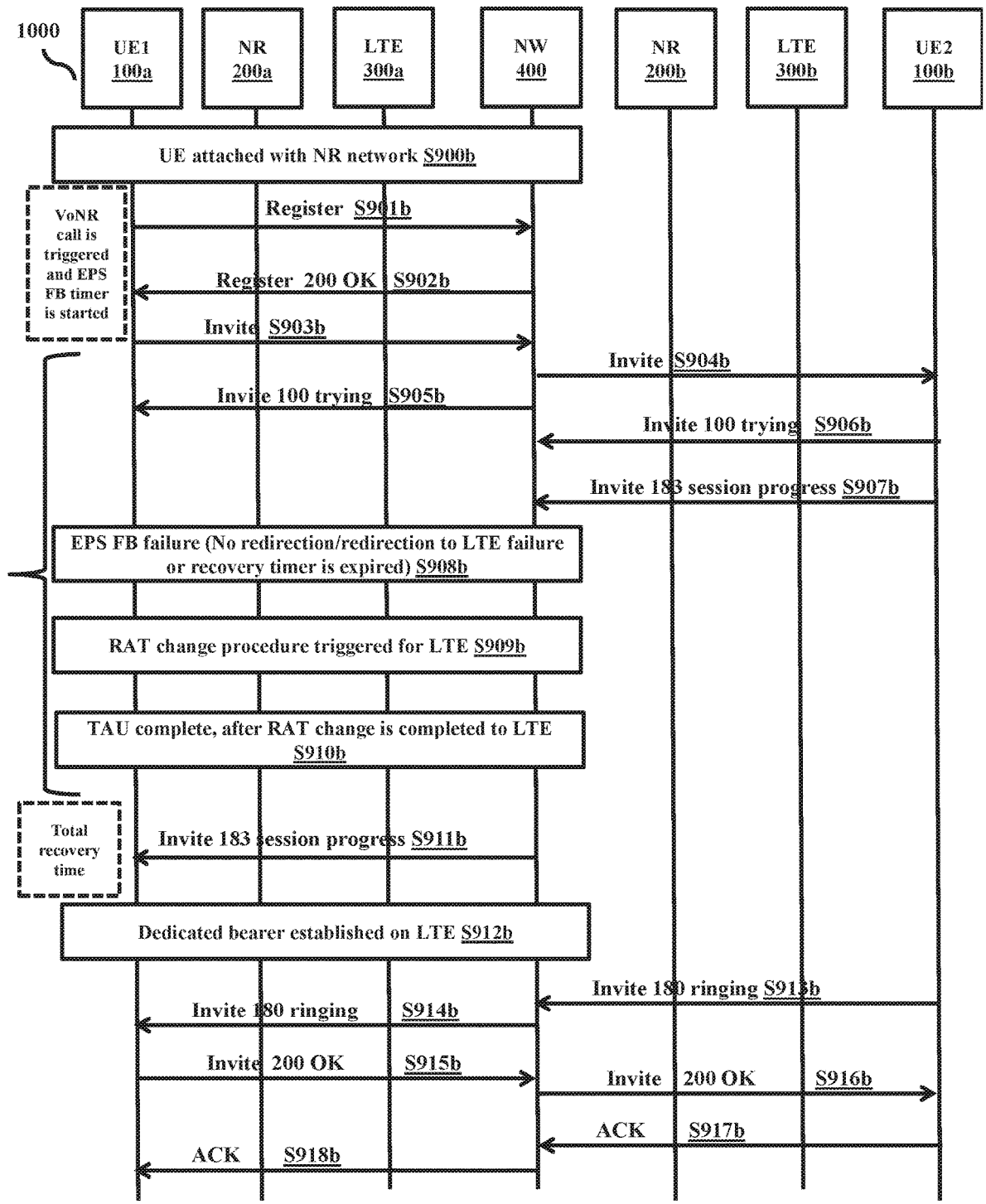

FIGS. 9A-9B illustrate a comparison between a silent redial procedure and the EPS FB timer (141) approach when an EPS FB procedure is failed, according to an embodiment as disclosed herein.

Referring to FIG. 9A: a scenario where the UE (100) uses a recovery procedure for retrying the failure call using a silent redial (existing mechanism). At step S900a-S908a, the UE (100) registered with the network on the NR (200a), the voice call triggered on the NR (200a) but failed to complete the EPS FB procedure. At step S909a-S915a, the UE (100) maintains a silent redial retry mechanism to recover the voice call. After recovery timer expiry or EPS FB failure notification, the UE (100) cancels the invite transaction by sending a cancel to the network (400). At step S916a-S917a, after the cancel procedure is completed, a new invite transaction triggers. In the silent redial, recovery time for retrying the call may take more time since the silent redial includes an EPS FB time value, a cancel procedure time, and a recovery timer value as below.

Total delay for silent redial=(recovery timer+cancel procedure Time+EPS FB Time)~1 to 2 min Referring to FIG. 9B: a scenario where the UE (100) uses a recovery procedure for retrying the failure call using the EPS FB timer (141). At step S901*b*-S908*b*, the UE (100) registered with the network (400) on the NR (200*a*), the voice call triggered on the NR (200*a*), the network (400) may not trigger EPS FB procedure or the UE (100) failed to complete EPS FB procedure. At step S909*b*-S918*b*, the UE (100) starts the EPS FB timer (141) of value half of the QoS timer value, when the EPS FB timer (141) expires, the UE (100) trigger the RAT change procedure to the LTE (300*a*) and after completion of RAT change procedure, the UE (100) recovers by receiving a 183 progress signaling, and continue the call establishment in the LTE (300*a*).

Total delay for EPS FB recovery=(EPS timer value+
LTE scan time)~5 sec

Embodiments of the present disclosure improve call Key Performance Indicators (KPI) and reduce call setup time. Additionally, or alternatively, the EPS FB timer value recommended may be used where the EPS FB timer is expired on either a mobile originator (MO) device or a mobile terminal (MT) device (i.e. the UE (100)). With the silent redial method, the voice call may be retried over the LTE (300) or the NR (200), depends on the current RAT, also the silent redial method may not recover the call due to cross over from both the MO and MT device and also the network fails to clear a context.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method comprising:
   sending, by a User Equipment (UE), an invite request to a server in a wireless network to initiate a Voice over New Radio (VoNR), wherein the UE is connected with a first network entity of the wireless network, and wherein the invite request comprises a media feature tag that indicates support for Evolved Packet System (EPS) fallback (EPS FB);
   receiving, by the UE, a response to the invite request, wherein the response includes the media feature tag;
   initiating, by the UE, an EPS FB timer based on the media feature tag and a Quality of service (QoS) timer;
   determining, by the UE, whether an EPS FB command is received from the server, wherein the EPS FB command indicates a handover (HO) from the first network entity to a second network entity; and
   establishing, by the UE based on whether the EPS FB command is received from the server, a call over the second network entity.

2. The method as claimed in claim 1, wherein establishing the call over the second network entity comprises:
   performing, by the UE, a Tracking Area Update (TAU) with the second network entity when the EPS FB command is received from the server;
   determining, by the UE, whether a dedicated bearer is allocated to the UE from the server to establish the call over the second network entity when the TAU is updated successfully with the second network entity; and
   establishing, by the UE, the call over the second network entity based on whether the dedicated bearer is allocated to the UE from the server, wherein the server terminates the EPS FB timer and the QoS timer.

3. The method as claimed in claim 2, establishing, by the UE, the call over the second network entity, wherein the UE releases the call and retries the call over a Circuit Switched Fall-back (CSFB) when the QoS timer is expired.

4. The method as claimed in claim 1, wherein establishing the call over the second network entity comprises:
   detecting, by the UE, that the EPS FB timer is expired;
   performing, by the UE, the HO from the first network entity to the second network entity when the EPS FB timer is expired;
   re-initiating, by the UE, the EPS FB timer;
   detecting, by the UE, that a Tracking Area Update (TAU) is updated successfully with the second network entity;
   determining, by the UE, whether the dedicated bearer is allocated to the UE from the server to establish the call over the second network entity when the TAU is updated successfully with the second network entity; and
   establishing, by the UE, the call over the second network entity based on whether the dedicated bearer is allocated to the UE from the server, wherein the server terminates the EPS FB timer and the QoS timer.

5. The method as claimed in claim 4, establishing, by the UE, the call over the second network entity, wherein the UE releases the call and retries the call over a Circuit Switched Fall-back (CSFB) when the QoS timer is expired.

6. The method as claimed in claim 1, wherein establishing the call over the second network entity comprises:
   sending, by the UE, the service request to the server to perform the HO from the first network entity to the second network entity when the EPS FB timer is expired;
   performing, by the UE, the HO from the first network entity to the second network entity in response to receiving acknowledgement of the service request;
   detecting, by the UE, that a Tracking Area Update (TAU) is updated successfully with the second network entity;
   determining, by the UE, whether the dedicated bearer is allocated to the UE from the server to establish the call over the second network entity when the TAU is updated successfully with the second network entity; and
   establishing, by the UE, the call over the second network entity based on whether the dedicated bearer is allocated to the UE from the server, wherein the server terminates the EPS FB timer and the QoS timer.

7. The method as claimed in claim 6, establishing, by the UE, the call over the second network entity, wherein the UE releases the call and retries the call over a Circuit Switched Fall-back (CSFB) when the QoS timer is expired.

8. The method as claimed in claim 1, initiating, by the UE, the EPS FB timer based on the media feature tag, wherein the media feature tag indicates that at least one of an EPS FB and the VoNR is supported by the UE and the server during an Internet Protocol (IP) Multimedia Subsystem (IMS) registration process.

9. The method as claimed in claim 8, wherein a history of the at least one of the EPS FB and the VoNR is stored in the UE.

10. The method as claimed in claim 1, wherein initiating, by the UE, the EPS FB timer based on the media feature tag, comprises:
performing, by the server, one of:
recommending the EPS FB to the UE when the server supports the EPS FB, wherein the UE enables the EPS FB timer, and
recommending the VoNR to the UE when the server supports the VoNR, wherein the UE disables the EPS FB timer.

11. The method as claimed in claim 1, establishing, by the UE, the call over the second network entity, wherein the EPS FB timer is configured based on deployment of at least one of the first network entity and the second network entity and requirement of operators associated with the at least one of the first network entity and the second network entity.

12. The method as claimed in claim 1, comprises:
sending, by the UE, the invite request to the server in the wireless network, wherein Internet Protocol (IP) Multimedia Subsystem (IMS) services are registered over a Wireless Fidelity (Wi-Fi);
detecting, by the UE, that signal quality of Wi-Fi decreases, wherein the UE has prior knowledge that the server does not support the VoNR and the UE is connected with the first network entity;
performing, by the UE, HO from the first network entity to the second network entity;
performing, by the UE, a Wi-Fi to LTE (W2L) HO to continue the call over the Wi-Fi;
sending, by the UE, the service request to the server to perform the HO from the first network entity to the second network entity when the Voice over Wi-Fi (VoWi-Fi) is initiated, the signal quality of the Wi-Fi is weak, and the server does not support the VoNR;
receiving, by the UE, an acknowledgement of the service request from the server and the EPS FB command from the server, a successful EPS FB, wherein the EPS FB command indicates the HO from the first network entity to the second network entity and information regarding the second network entity;
performing, by the UE, a Tracking Area Update (TAU) with the server after connecting to the second network entity and IMS Packet Data Network (PDN) connection HO to the second network entity;
sending, by the UE, a registration request to the server and receives an acknowledgement for the registration request; and
establishing, by the UE, the call over the second network using the dedicated bearer.

13. A User Equipment (UE) for wireless communication, the UE comprising:
a memory;
a processor;
a communicator; and
an Evolved Packet System (EPS) fallback (EPS FB) controller, configured to:
send an invite request to a server in a wireless network to initiate a Voice over New Radio (VoNR), wherein the UE is connected with a first network entity of the wireless network, and wherein the invite request comprises a media feature tag that indicates support for EPS FB;
receive a response to the invite request, wherein the response includes the media feature tag;
initiate an EPS FB timer based on the media feature tag and a Quality of service (QoS) timer;
determine whether an EPS FB command is received from the server, wherein the EPS FB command indicates a handover (HO) from the first network entity to a second network entity; and
establish, based on whether the EPS FB command is received from the server, a call over the second network entity.

14. The UE as claimed in claim 13, wherein establish the call over the second network entity comprises:
perform a Tracking Area Update (TAU) with the second network entity when the EPS FB command is received from the server;
determine whether the dedicated bearer is allocated to the UE from the server to establish the call over the second network entity when the TAU is updated successfully with the second network entity; and
establish the call over the second network entity based on whether the dedicated bearer is allocated to the UE from the server, wherein the server terminates the EPS FB timer and the QoS timer.

15. The UE as claimed in claim 13, wherein establish the call over the second network entity comprises:
detect that the EPS FB timer is expired;
perform the HO from the first network entity to the second network entity when the EPS FB timer is expired;
re-initiate the EPS FB timer;
detect that a Tracking Area Update (TAU) is updated successfully with the second network entity;
determine whether the dedicated bearer is allocated to the UE from the server to establish the call over the second network entity when the TAU is updated successfully with the second network entity; and
establish the call over the second network entity based on whether the dedicated bearer is allocated to the UE from the server, wherein the server terminates the EPS FB timer and the QoS timer.

16. The UE as claimed in claim 13, wherein establish the call over the second network entity comprises:
send the service request to the server to perform the HO from the first network entity to the second network entity when the EPS FB timer is expired;
perform the HO from the first network entity to the second network entity in response to receiving acknowledgement of the service request;
detect that a Tracking Area Update (TAU) is updated successfully with the second network entity;
determine whether the dedicated bearer is allocated to the UE from the server to establish the call over the second network entity when the TAU is updated successfully with the second network entity; and
establish the call over the second network entity based on whether the dedicated bearer is allocated to the UE from the server, wherein the server terminates the EPS FB timer and the QoS timer.

17. The UE as claimed in claim 13, wherein the media feature tag indicates that at least one of an EPS FB and the VoNR is supported by the UE and the server during an Internet Protocol (IP) Multimedia Subsystem (IMS) registration process.

18. The UE as claimed in claim 17, comprises:

send the invite request to the server in the wireless network, wherein IMS services are registered over a Wi-Fi network;

detect that signal quality of Wi-Fi decreases, wherein the UE has prior knowledge that the server does not support the VoNR and the UE is connected with the first network entity;

perform HO from the first network entity to the second network entity;

perform a Wi-Fi to LTE (W2L) HO to continue call over the Wi-Fi network;

send the service request to the server to perform the HO from the first network entity to the second network entity, when the Voice over Wi-Fi (VoWi-Fi) is initiated, the signal quality of Wi-Fi is weak and the server does not support the VoNR;

receive an acknowledgement of the service request from the server and the EPS FB command from the server, a successful EPS FB, wherein the EPS FB command indicates the HO from the first network entity to the second network entity and information regarding the second network entity;

perform a Tracking Area Update (TAU) with the server after connecting to the second network entity and IMS Packet Data Network (PDN) connection HO to the second network entity;

send a registration request to the server and receives an acknowledgement for the registration request; and establish the call over the second network using the dedicated bearer.

19. A server comprising:

a memory;

a processor;

a communicator; and an Evolved Packet System (EPS) fallback (EPS FB) controller, configured to:

receive an invite request from a User Equipment (UE), where the invite request comprises a media feature tag that indicates support for EPS FB;

send a response to the received invite request, wherein the response includes with the media feature tag;

send an EPS FB command to the UE, wherein the EPS FB command indicates a handover (HO) from a first network entity to a second network entity; and allocate a dedicated bearer to the UE to establish a call by at least one of receiving a service request from the UE, allocating the dedicated bearer on successful Tracking Area Update (TAU), and receiving an update request from the UE when an EPS FB timer is expired.

20. The server as claimed in claim 19, wherein the EPS FB controller is configured to, in response to the received invite request comprising the media feature tag, perform one of:

recommend the EPS FB to the UE when the server supports the EPS FB, wherein the UE enables the EPS FB timer based on the recommended EPS FB; and recommend a VoNR to the UE when the server supports the VoNR, wherein the UE disables the EPS FB timer based on the recommended VoNR.

* * * * *